United States Patent
Sugimoto et al.

(10) Patent No.: US 9,356,448 B2
(45) Date of Patent: May 31, 2016

(54) ELECTRIC POWER CONVERTER FOR COMBINED POWER GENERATION SYSTEM

(75) Inventors: Kazushige Sugimoto, Amagasaki (JP); Masahide Kawamura, Kobe (JP); Kentaro Sakata, Akashi (JP); Mitsuchika Ogawa, Kobe (JP); Kentaro Tsuda, Kobe (JP); Takefumi Iizaka, Kobe (JP); Yuko Hirase, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 383 days.

(21) Appl. No.: 14/131,447

(22) PCT Filed: Jul. 4, 2012

(86) PCT No.: PCT/JP2012/004316
§ 371 (c)(1),
(2), (4) Date: Feb. 12, 2014

(87) PCT Pub. No.: WO2013/008413
PCT Pub. Date: Jan. 17, 2013

(65) Prior Publication Data
US 2014/0152110 A1    Jun. 5, 2014

(30) Foreign Application Priority Data
Jul. 8, 2011   (JP) ................. 2011-151372

(51) Int. Cl.
*H02J 7/00* (2006.01)
*H02J 9/00* (2006.01)
(Continued)

(52) U.S. Cl.
CPC . *H02J 4/00* (2013.01); *H02J 3/381* (2013.01); *H02J 3/46* (2013.01); *H02M 7/53871* (2013.01);
(Continued)

(58) Field of Classification Search
CPC ............... H02J 3/381; H02J 3/46; H02J 4/00; H02J 3/32; H02J 3/383; H02J 3/386; H02M 7/53871; Y02E 10/563; Y02E 10/566; Y02E 10/763; Y10T 307/625
USPC .......................................................... 307/66
See application file for complete search history.

(56) References Cited

U.S. PATENT DOCUMENTS

| | | | |
|---|---|---|---|
| 2009/0027037 A1* | 1/2009 | Strnad ....................... | H02J 3/38 324/76.11 |
| 2012/0089261 A1* | 4/2012 | Kim ..................... | H02J 13/0062 700/286 |

FOREIGN PATENT DOCUMENTS

| | | |
|---|---|---|
| EP | 1 122 856 A2 | 8/2001 |
| JP | 2000-308264 A | 11/2000 |

(Continued)

OTHER PUBLICATIONS

Mar. 19, 2015 Extended Search Report issued in European Application No. 12812003.7.
International Search Report issued in International Patent Application No. PCT/JP2012/004316 dated Sep. 11, 2012.

*Primary Examiner* — Rexford Barnie
*Assistant Examiner* — Toan Vu
(74) *Attorney, Agent, or Firm* — Oliff PLC

(57) ABSTRACT

The present invention provides an electric power converting unit that does not require a change in a control method in, for example, system interconnection by calculating a target value of an output current of an electric power converter from an internal phase angle calculated from an active electric power control loop and an internal electromotive voltage calculated from a reactive electric power control loop. Thus, a stand-alone power supply system that is easy to handle can be configured.

11 Claims, 20 Drawing Sheets

(51) Int. Cl.
*H02J 4/00* (2006.01)
*H02J 3/38* (2006.01)
*H02J 3/46* (2006.01)
*H02M 7/5387* (2007.01)
*H02J 3/32* (2006.01)

(52) U.S. Cl.
CPC .. *H02J 3/32* (2013.01); *H02J 3/383* (2013.01); *H02J 3/386* (2013.01); *Y02E 10/563* (2013.01); *Y02E 10/566* (2013.01); *Y02E 10/763* (2013.01); *Y10T 307/625* (2015.04)

(56) References Cited

FOREIGN PATENT DOCUMENTS

| | | |
|---|---|---|
| JP | A-2007-20361 | 1/2007 |
| JP | A-2007-129845 | 5/2007 |
| JP | 2008278700 A | 11/2008 |
| JP | A-2009-225599 | 10/2009 |
| JP | A-2010-116071 | 5/2010 |
| KR | 101038274 B1 | 6/2011 |

\* cited by examiner

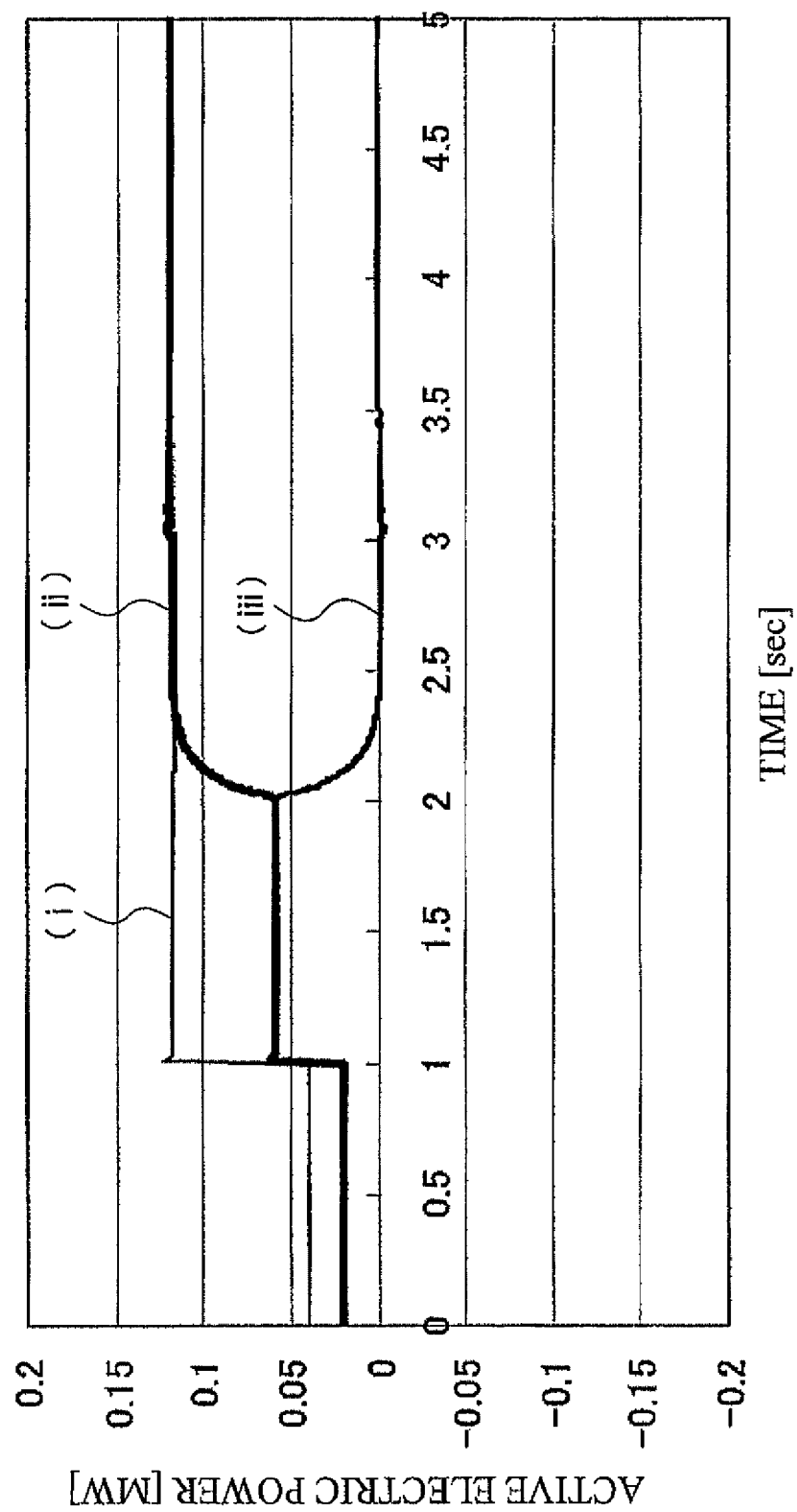

ELECTRIC POWER CONVERTER FOR COMBINED POWER GENERATION SYSTEM

TECHNICAL FIELD

The present invention relates to a combined power generation system including plural types of power supplies, and particularly to an electric power converter in a power storage facility including power storage devices, such as secondary batteries.

BACKGROUND ART

A typical electric power system is a commercial electric power system supplied by an electric power company, and the power supply quality of the commercial electric power system is maintained mainly by the electric power company.

On the other hand, the power supply quality of a stand-alone power supply system not connected to the commercial electric power system needs to be maintain by itself. Examples of the stand-alone power supply system include a power supply system in a ship and a micro grid that is a network formed by combining plural types of power supplies in a certain region.

PTL 1 discloses a power supply system in a ship, the power supply system including a plurality of auxiliary power generators, an electric power storage device configured to perform charge and discharge, and an electric propulsion unit. The power supply system further includes: an electric power detecting unit configured to detect electric power consumed by the electric propulsion unit; a start-up switch configured to output a start-up command; and a control circuit configured to change a mode of the electric power storage device into a charge mode when a detection signal of the electric power detecting unit is equal to or lower than a threshold value and change the mode of the electric power storage device into a discharge mode by the start-up command of the start-up switch to cause the electric power storage device to discharge the stored electric power to a ship electric power bus line. In a case where the ship comes into a port and sails while lowering a propulsion power of the electric propulsion unit, and the power consumption of the ship becomes equal to or lower than a threshold value, the control circuit causes the auxiliary power generators to charge the electric power storage device. In a case where the control circuit receives the start-up command of the start-up switch during the above charge operation, the control circuit causes the electric power storage device to discharge the electric power to supply the discharged electric power to the electric propulsion unit. Then, in a period from when the ship comes into a port until when the ship comes alongside a pier, an auxiliary prime mover configured to drive the auxiliary power generator is efficiently operated. With this, the amount of fuel used by the auxiliary prime mover is reduced, and an exhaust gas is also reduced, which are disclosed in PTL 1.

Such a power supply system in the ship is typically a stand-alone power supply system that is independent from the commercial electric power system. While the ship is moored at the pier, the power supply system in the ship is connected to the commercial electric power system to receive electric power.

PTL 2 discloses a technology in which in a micro grid including a prime mover power generator, a distributed power supply utilizing natural energy, such as solar power generation and wind power generation, and a power storage facility having a secondary battery, the stability and quality of the micro grid are secured by using an electric power converter included in the power storage facility.

The power supply system in the ship, the micro grid, or the like is a combined power generation system including a prime mover power generator, an electric power storage device constituted by a secondary battery and an electric power converting unit, and various power supplies, such as a power generator using a solar battery and a power generator using a fuel cell.

PTL 3 discloses a technology regarding an electric power converter used in an electric power storage device and capable of covering a harmonic component and unbalanced component of a load current without additionally providing a detecting unit configured to detect, for example, a load current. To be specific, the electric power converter includes a control portion and an electric power converting portion capable of converting DC power of a secondary battery into AC power and converting AC power, input through an output line, into DC power to store the DC power in the secondary battery. A virtual electric power generator is provided in advance instead of the electric power converting portion and the secondary battery in the control portion, and the control portion includes: a virtual electric power generator model portion configured to calculate a current value to be output, based on the voltage of the output line of the electric power converting portion and set the obtained current value as a current command value; and a control signal generating portion configured to output to the output line a current corresponding to the current command value. Then, in the virtual electric power generator model portion, an engine model converts a fuel supply amount, calculated by a governor model, into a mechanical torque of an engine without considering a response characteristic of the engine, to calculate an angular velocity and phase angle of the power generator by using the mechanical torque, which is disclosed in PTL 3.

There are two types of electric power converters that are a current control type electric power converter and a voltage control type electric power converter depending on control methods. PTL 4 discloses a technology regarding a current control type electric power converting unit. To be specific, PTL 4 discloses a technology regarding a parallel operation device configured to suppress a load change of a stand-alone power supply system constituted by an electric power storage device using a DC power supply for electric power storage and a synchronous power generator. Specifically, PTL 4 discloses a technology regarding the parallel operation device configured such that to adequately respond to a sudden load change or unbalanced load in the parallel operation device, an active current set value is obtained by inputting to a frequency control unit a signal generated by applying to a frequency set value a negative correction amount that is based on drooping characteristics of the frequency of the stand-alone power supply system, and a reactive current set value is obtained by inputting to a voltage control unit a signal generated by applying a negative correction amount that is based on drooping characteristics of the voltage to a difference between a voltage set value and a voltage effective value of the stand-alone power supply system.

CITATION LIST

Patent Literature

PTL 1: Japanese Laid-Open Patent Application Publication No. 2010-116071

PTL 2: Japanese Laid-Open Patent Application Publication No. 2007-129845

PTL 3: Japanese Laid-Open Patent Application Publication No. 2009-225599

PTL 4: Japanese Laid-Open Patent Application Publication No. 2007-020361

SUMMARY OF INVENTION

Technical Problem

As described above, depending on the control method, there are the current control type electric power converter and the voltage control type electric power converter. Features of each control method are as below.

The current control type electric power converter is controlled so as to output a predetermined current regardless of the voltage and frequency of an electric power system connected thereto. The current control type electric power converter is mainly used as an electric power converter for electric power system interconnection. The voltage and frequency are basically maintained by the other electric power generation facility (such as a commercial electric power system or a prime mover power generator), and the current control type electric power converter cannot perform a self-sustaining operation by itself, and the current control type electric power converters cannot perform the self-sustaining operation in combination.

On the other hand, the voltage control type electric power converter is controlled so as to output electric power having a certain voltage and frequency regardless of an output current. The voltage control type electric power converter is mainly used as an electric power converter for performing the self-sustaining operation by itself. Since the output becomes unstable, the voltage control type electric power converter cannot perform the interconnected operation with an electric power system, and the voltage control type electric power converters cannot perform the parallel operation.

Next, problems of the power supply system will be explained.

As the micro grid or the stand-alone power supply system in a ship, the combined power generation system is configured by combining a plurality of electric power generation facilities having different characteristics and may be connected to a typical commercial electric power system depending on operation states. Examples of the electric power generation facility include: prime mover power generators, such as diesel power generators, gas turbine power generators, and gas engine power generators; natural energy power generators using solar power generation, wind power generation, or the like; fuel cells; and secondary batteries. Among these, the solar power generators, the fuel cells, the secondary batteries, and the like are DC power supplies, and an electric power converter configured to convert DC power into AC power is used for connection with an AC power supply system.

In many cases, the micro grid and the like are required to be able to perform both the interconnected operation with the typical commercial electric power system and the self-sustaining operation. In addition, in the case of the self-sustaining operation, the configuration of the electric power generation facilities may change, and the power supply system may be configured only by the electric power generation facilities each using the electric power converter depending on the situation.

In a case where the micro grid or the like is being connected to the typical commercial electric power system, the electric power converter of the micro grid is the current control type electric power converter as described above.

Here, a case where the micro grid or the like is separated from the typical commercial electric power system and performs the self-sustaining operation is considered. In a case where the prime mover power generator is included in the micro grid, the voltage and frequency of the stand-alone power supply system are maintained and controlled by the prime mover power generator, and the electric power converter is the current control type. In this case, the prime mover power generator transiently covers the entire load change, so that the power supply quality of the electric power system depends on the characteristics and capacity of the prime mover power generator. In this case, a high-capacity prime mover power generator is required.

On the other hand, in a case where the micro grid is constituted only by the power supplies using the electric power converters, and all the electric power converters are the current control type electric power converters, the voltage and frequency of the micro grid become unstable, so that the micro grid cannot operate. Therefore, one of the electric power converters needs to be replaced with the voltage control type electric power converter. However, since the transient load change is covered by one voltage control type electric power converter, the responsiveness to the load change is limited to the capacity of the voltage control type electric power converter. The voltage control type electric power converter needs to be operated at all times, and the power supply needs to be able to follow the output change.

As described above, in a case where a plurality of voltage control type electric power converters are operated in parallel, a load sharing rate of each electric power converter becomes unstable. As a method of avoiding this, there is a method of stably performing the load sharing by setting drooping characteristics of the output of the voltage control type electric power converter relative to the voltage and frequency. However, since the impedance of the electric power converter is low, and the output balance is significantly lost by a small voltage difference between the electric power converters, the stable operation cannot be realized only by the drooping characteristics.

In a case where the micro grid or the like that has been performing the self-sustaining operation is connected to the commercial electric power system, the control method of the electric power converting unit that has been operated as the voltage control type electric power converter needs to be changed into the current control type method.

An object of the present invention is to provide an electric power converter that does not require changing a control method when a combined power generation system, such as a micro grid, switches from a self-sustaining operation to a interconnected operation and an electric power converter that does not require a high-capacity prime mover power generator in the electric power system.

Solution to Problem

To achieve the above object, an electric power converter for a combined power generation system according to the present invention is provided at a power supply system constituted by a plurality of electric power generation facilities each including a power storage facility including a power storage device and an electric power converting unit, the electric power converter including: a voltage measuring unit configured to measure a voltage of the power supply system; a frequency measuring unit configured to measure a frequency of the power supply system; an electric power measuring unit configured to measure active electric power and reactive electric power at an output terminal of the power storage facility; and a system control device, wherein: the system control device includes a frequency command value calculating portion including a first proportional calculation unit configured to perform a proportional calculation of a difference between an active electric power command value and the active electric power measured by the electric power measuring unit and a first adder configured to add a reference frequency to an output of the first proportional calculation unit to calculate a frequency command value, an internal phase angle calculating portion configured to accumulate differences each between the frequency command value calculated by the frequency command value calculating portion and the frequency measured by the frequency measuring unit, to calculate an internal phase angle, an internal electromotive voltage command value calculating portion including a second proportional calculation unit configured to perform a proportional calculation of a difference between a reactive electric power command value and the reactive electric power measured by the electric power measuring unit and a second adder configured to add a reference voltage to an output of the second proportional calculation unit to calculate an internal electromotive voltage command value, and a current command value calculating portion configured to calculate a command value of an output current of the electric power converting unit from the internal phase angle, the internal electromotive voltage command value, and the voltage measured by the voltage measuring unit; and the system control device outputs the command value of the output current to the electric power converting unit to control the electric power converting unit.

In the present invention, the "combined power generation system" is a power supply system constituted by a plurality of electric power generation facilities and load facilities and may be connected to a commercial electric power system or may be a stand-alone power supply system that is not connected to the commercial electric power system. The "electric power generation facility" may be only a power storage facility or may include the power storage facility and, for example, a prime mover power generator.

In this configuration, the "power storage facility" is constituted by a power storage device and an electric power converting unit. The "power storage device" is a battery or a capacitor, and DC power can be taken out from the "power storage device". Examples of the "power storage device" include a primary battery, a secondary battery, an electric double layer capacitor, and a fuel cell. Storage of electric power may be referred to as "charge", and Take-out of electric power may be referred to as "discharge". The "electric power converting unit" is constituted by: an electric power conversion circuit constituted by a switching element; and a PWM (Pulse Width Modulation) control portion configured to turn on and off the switching element. The electric power converter according to the present invention includes the electric power converting unit, various measuring units (such as a voltage detector), and a control device.

The active electric power command value and the reactive electric power command value are preset, predetermined numerical values and may be changeable constant values. For example, the active electric power command value and the reactive electric power command value may be settable through a man-machine system. Similarly, the reference voltage and the reference frequency are reference set values of control operations. For example, the reference voltage and the reference frequency may be changeable through a man-machine system.

The PWM control portion of the electric power converting unit turns on and off the switching element such that, for example, the output current of the electric power converting unit corresponds to the given current command value. This electric power converting unit may be referred to as a current control type electric power converting unit.

In the electric power converter for the combined power generation system according to the present invention, the internal electromotive voltage command value calculating portion subtracts a voltage drop from an output of the second adder to calculate the internal electromotive voltage command value, the voltage drop being caused by a total impedance that is a sum of an internal impedance of the power storage facility and an external impedance between the power storage facility and the power supply system.

According to this configuration, the power storage facility is regarded as a power generator having an internal electromotive force and an impedance, and this equivalent circuit calculates as an internal electromotive voltage set value an internal electromotive voltage generated from the internal electromotive force.

The "internal impedance" can be calculated by, for example, Thevenin's theorem. The actual internal impedance is said to be typically an extremely small value. The "external impedance" is constituted by a reactor provided between the electric power converting unit and the electric power system and a wiring resistance.

The current value is being measured. Therefore, if the total impedance is determined, the internal electromotive voltage can be calculated from the system voltage value by a back calculation.

In the electric power converter for the combined power generation system according to the present invention, in a case where the total impedance is connected between a power supply having the voltage measured by the voltage measuring unit and a power supply having a voltage shown by the internal electromotive voltage command value, a value of a current flowing through the total impedance is output as the command value of the output current.

According to this configuration, the internal impedance is set to be a value larger than an actual value, the value of the current flowing therethrough is calculated, and the electric power converting unit is controlled such that the current thereof corresponds to this current value. With this, the more stable operation of the electric power converting unit can be realized.

The current value is calculated from the internal electromotive voltage and phase angle calculated by respective calculating portions including the reactive electric power proportional control loop and the active electric power proportional control loop. Therefore, the control is apparently the current control, but an aspect thereof is electric power control or voltage control.

In the electric power converter for the combined power generation system according to the present invention, a value of the internal impedance of the power storage facility is set to a value larger than an actual value, and the internal electromotive voltage and an output of the current command value calculating portion are calculated.

According to this configuration, the more stable operation can be expected by setting the internal impedance to a large value. In a case where the internal impedance is large, the loss is large. However, by setting a large virtual impedance as above, the actually generated loss can be suppressed, and the control operation of the electric power converting unit can be stabilized. For example, in a case where the internal impedance is substantially zero, and a resistance is 0.1 pu and a reactance is 0.4 pu in the total impedance, the control operation of the electric power converting unit can be stabilized significantly.

In the electric power converter for the combined power generation system according to the present invention, the voltage measuring unit and the frequency measuring unit include a voltage detector configured to measure the voltage of the power supply system and a PLL calculating portion configured to perform a phase synchronous calculation of an output of the voltage detector, the voltage of the power supply system is detected from the output of the voltage detector, and the frequency and phase of the power supply system are detected from an output of the PLL calculating portion.

According to this configuration, instantaneous values of voltages of specific two phases (such as RS and ST phases) are detected through a potential transformer connected to a three-phase AC power supply system. These values are taken in, for example, a calculator to be subjected to a PLL (Phase Locked Loop) calculation (phase synchronous calculation). Thus, the frequency and the voltage are calculated. Then, instantaneous values of currents of specific two phases (such as R and T phases) are detected through a current transformer connected to the three-phase AC power supply system, and electric power is calculated. With this, regarding the voltage and frequency, a measurement lag is smaller than that of a typical electric power meter, so that satisfactory responsiveness can be obtained by adjusting the load sharing utilizing the voltage and frequency.

In the electric power converter for the combined power generation system according to the present invention, the electric power measuring unit includes a voltage detector configured to measure the voltage of the power supply system, a PLL calculating portion configured to perform a phase synchronous calculation of an output of the voltage detector, and a current detector configured to measure an output current of the power storage facility, and the active electric power and the reactive electric power are calculated from an output of the current detector and a voltage calculated by the PLL calculating portion.

According to this configuration, when the output current is positive, the power storage device performs discharge, so that the electric power flows from the electric power converting unit to the electric power system. In contrast, when the output current is negative, the power storage device performs charge, so that the electric power flows from the electric power system to the electric power converting unit.

In the electric power converter for the combined power generation system according to the present invention, the frequency command value calculating portion is able to individually change a proportionality factor of the first proportional calculation unit and the active electric power command value, and the internal electromotive voltage command value calculating portion is able to individually change a proportionality factor of the second proportional calculation unit and the reactive electric power command value.

According to this configuration, by changing or adjusting the proportionality factor and the command values, the load sharing between the power storage facilities or between the power storage facility and the other power generator can be easily performed.

In the electric power converter for the combined power generation system according to the present invention, a first time lag calculation unit is interposed between the first proportional calculation unit and the first adder, and a second time lag calculation unit is interposed between the second proportional calculation unit and the second adder.

According to this configuration, the time lag calculation unit is a calculation unit that performs time lag processing and may be, for example, a first-order lag calculation unit. In addition, the time lag calculation unit may be a moving average calculation unit or a second-order lag calculation unit. A limiter may be provided in front of or behind the time lag calculation unit to limit an output value of the time lag calculation unit.

In this configuration, the magnitude of the time lag of the time lag calculation unit may be calculated from the inertia moment of the prime mover power generator connected to the power supply system. Preferably, a time constant of the response of the prime mover power generator may be set as a time constant of the time lag calculation unit.

In the electric power converter for the combined power generation system according to the present invention, the power supply system is a stand-alone power supply system configured by connecting a prime mover power generator and a power generator utilizing natural energy.

In the present invention, the stand-alone power supply system is a power supply system that is independent from a commercial electric power system. Regarding the stand-alone power supply system, there is generally no element, such as the commercial electric power system, which dominates the system voltage and frequency, and the frequency and voltage are determined by demand and supply of electric power.

In the electric power converter for the combined power generation system according to the present invention, the power supply system is a stand-alone power supply system configured by connecting a plurality of the power storage facilities.

In the electric power converter for the combined power generation system according to the present invention, a commercial electric power system is connectable to the power supply system through a circuit breaker.

Advantageous Effects of Invention

According to the present invention, in the combined power generation system, such as a micro grid, the switching between the system interconnected operation and the self-sustaining operation can be performed without changing the control method. In addition, the operation of the prime mover power generator is not required, and the stand-alone power supply system can be operated only by the electric power converter.

BRIEF DESCRIPTION OF DRAWINGS

FIG. 8C is a graph showing a result of a simulation test of active electric power in a case where two electric power converters for the combined power generation system according to the present invention are operated in parallel.

DESCRIPTION OF EMBODIMENTS

Hereinafter, an embodiment of the present invention will be explained in reference to the drawings. In the following explanations and drawings, the reference signs are used for the same or corresponding components, and a repetition of the same explanation is avoided.

Figure 1:
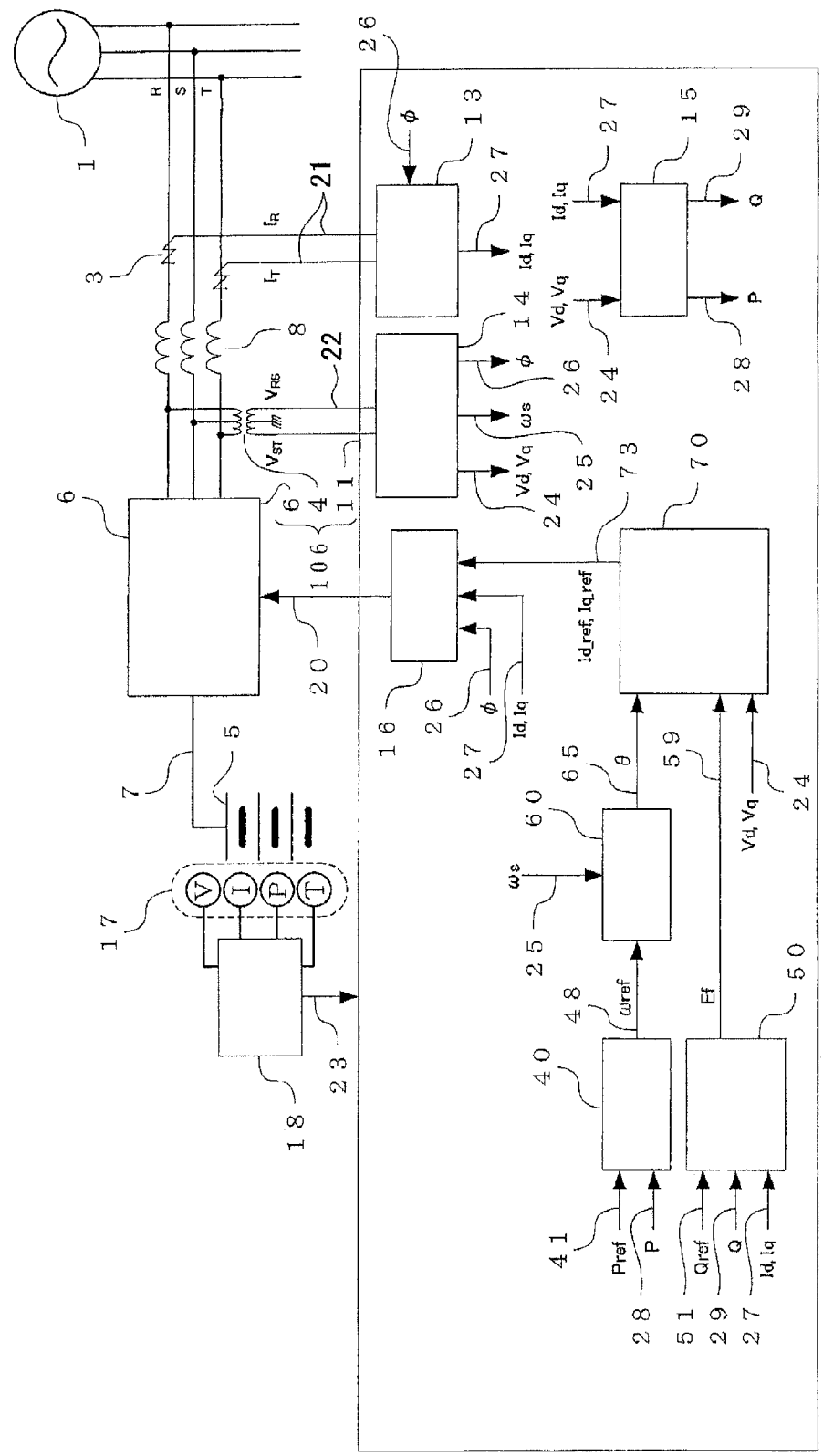
FIG. 1 is a diagram showing a control block of an electric power converter for a combined power generation system according to an embodiment of the present invention.

An electric power converter for a combined power generation system according to the embodiment of the present invention will be explained in reference to a control block shown in FIG. 1. FIG. 1 is a diagram showing the control block of the electric power converter for the combined power generation system according to the embodiment of the present invention.

A secondary battery 5 is connected to an electric power conversion circuit 6 through a DC power line 7. By turning on or off a power semiconductor element, not shown, at high speed, the electric power conversion circuit 6 converts DC power, supplied from the secondary battery 5, into predetermined AC power to output the AC power to an AC power supply system 1 or converts the AC power, supplied from the AC power supply system 1, into the DC power to charge the secondary battery 5. Instead of the secondary battery, an electric double layer capacitor may be used as a power storage device.

A voltage detector 4 configured to detect the voltage of the power supply system and a current detector 3 configured to detect the current flowing through the electric power conversion circuit 6 are provided at the AC power supply system 1. The output of the voltage detector 4 is connected to a voltage/frequency/phase calculating portion 14 of a system control device 11 through a wire 22, and the output of the current detector 3 is connected to a current calculating portion 13 of the system control device 11 through a wire 21. The voltage detector 4 is a potential transformer known as PT, and the current detector 3 is a current transformer known as CT.

The system control device 11 is constituted by the current calculating portion 13, the voltage/frequency/phase calculating portion 14, an active/reactive electric power calculating portion 15, a frequency command value calculating portion 40, an internal electromotive voltage command value calculating portion 50, an internal phase angle calculating portion 60, a current command value calculating portion 70, and an electric power converter control portion 16.

A gate drive signal 20 is output from the electric power converter control portion 16 to the electric power conversion circuit 6. PWM control of a gate of the power semiconductor element is performed by the gate drive signal 20. Thus, the DC power of the secondary battery 5 is converted into AC power having a desired voltage, frequency, and phase, and the AC power is supplied to the AC power supply system 1. Or, the AC power supplied from the AC power supply system 1 is converted into the DC power, and the DC power charges the secondary battery 5.

A battery state detector 17 configured to detect states, such as a voltage, a current, a temperature, and a pressure, of the secondary battery is attached to the secondary battery 5. The battery state detector 17 monitors the states of the secondary battery at a secondary battery monitoring device 18 and calculates the SOC (State Of Charge) of the secondary battery 5.

The secondary battery monitoring device 18 is connected to the system control device 11 through a wire 23. In a case where a state abnormality of the secondary battery 5 is detected, the operation of the electric power conversion circuit 6 is stopped through the electric power converter control portion 16.

Next, details of the electric power converter for the combined power generation system according to the embodiment of the present invention will be explained in reference to FIGS. 2 to 7.

1. Voltage/Frequency/Phase Calculating Portion and PLL Calculation

Figure 2A:
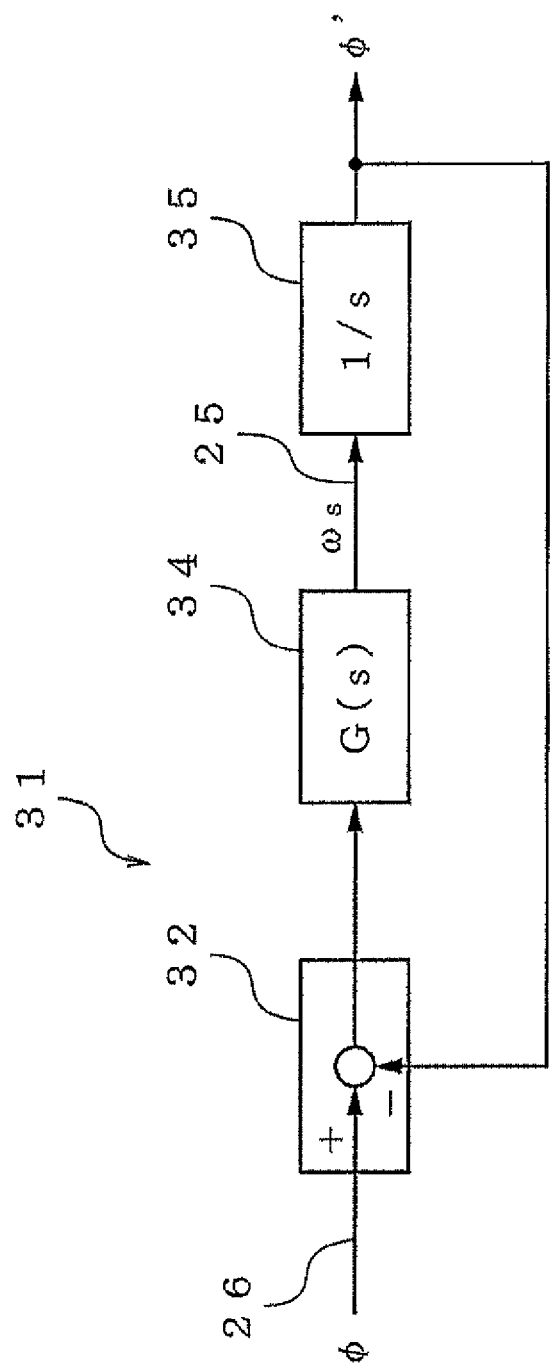
FIG. 2A is one example of a block diagram of a PLL calculating portion configured to calculate a system voltage and a system frequency in the control block of FIG. 1.
Figure 2B:
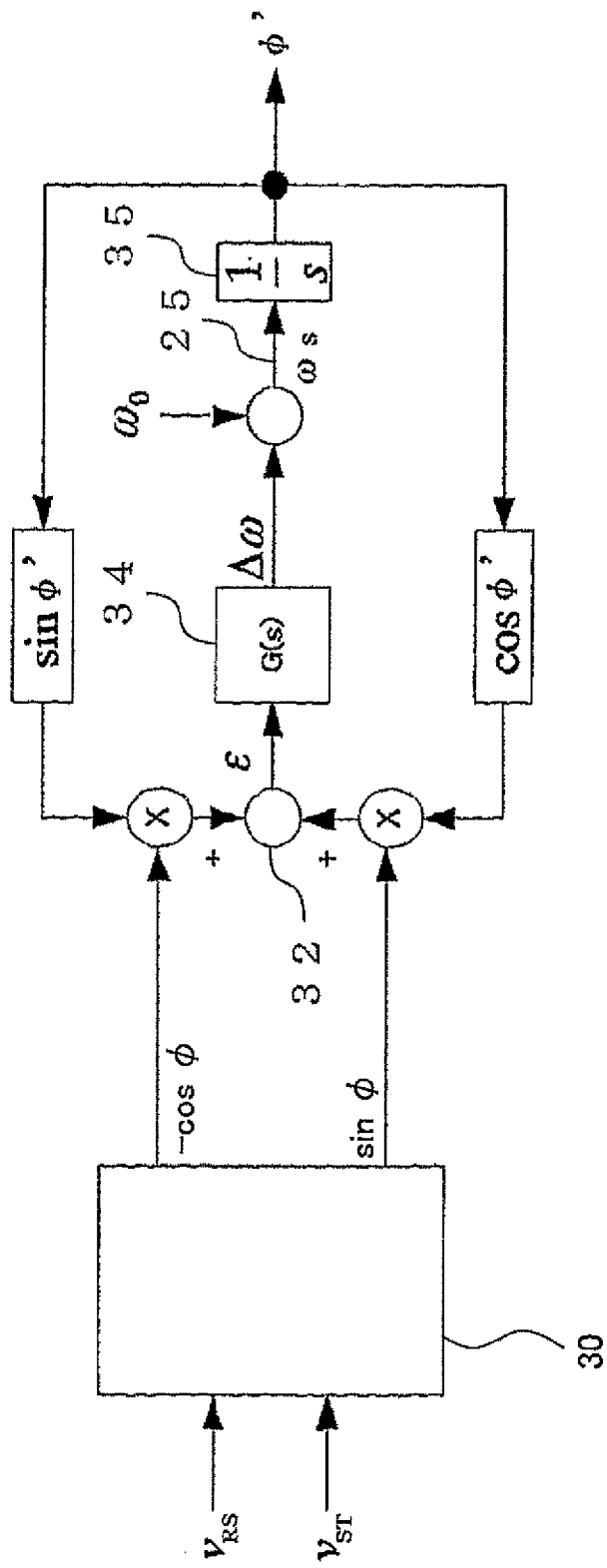
FIG. 2B is one example of a block diagram showing calculation processing in the PLL calculating portion configured to calculate the system voltage and the system frequency in the control block of FIG. 1.

FIGS. 2A and 2B are diagrams for explaining a PLL calculating circuit 31 in the voltage/frequency/phase calculating portion 14. The voltage and frequency of the AC power supply system 1 are calculated by the PLL calculating circuit 31.

FIG. 2A is one example of a block diagram of a PLL calculating portion (PLL calculating circuit 31) configured to calculate the system voltage and the system frequency, and FIG. 2B is a block diagram showing calculation processing in the PLL calculating portion (PLL calculating circuit 31) configured to calculate the system voltage, the system frequency, and the phase.

The frequency and phase of the AC power supply system 1 are calculated by the PLL calculating circuit 31 based on a voltage signal output from the voltage detector 4. To be specific, instantaneous values vRS and vST of a line voltage of the AC power supply system 1 are measured by the voltage detector 4 provided at the electric power conversion circuit 6 and input to the PLL calculating circuit 31 (see FIG. 1). The PLL calculating circuit 31 performs estimated calculations of the frequency and phase of the AC power supply system 1 using the instantaneous values vRS and vST of the above voltage.

In calculation block diagrams of the PLL calculating circuit 31 shown in FIGS. 2A and 2B, the PLL calculating circuit 31 is constituted by: an αβ converter 30 configured to calculate a phase φ from line voltage values (vRS and vST); a phase comparator 32 configured to calculate a difference between the phase φ calculated by the αβ converter 30 and a phase φ' estimated in the PLL calculating circuit 31; a loop filter 34 configured to estimate an angular velocity (frequency) of the AC power supply system 1 from the phase difference; and an accumulator 35 configured to accumulate the estimated angular velocities to calculate an estimated phase φ'.

The phase of the power supply system 1 is obtained by αβ conversion of the instantaneous values vRS and vST of the system line voltage obtained from the voltage detector 4. An instantaneous value vector vαβ is defined as a formula below where vR, vS, and vT denote instantaneous values of phase voltages of respective phases of the electric power system side.

$$v_{\alpha\beta} = \sqrt{\frac{2}{3}}\left(v_R + v_S e^{j\frac{2\pi}{3}} + v_T e^{j\frac{4\pi}{3}}\right) \quad \text{Formula 1}$$

Based on Euler's formula ($\epsilon j\phi = \cos \phi + j \cdot \sin \phi$), the instantaneous value vector vαβ can be represented by a formula below.

$$v_{\alpha\beta} =$$

$$v_\alpha + jv_\beta = \sqrt{\frac{2}{3}}\left\{\left(v_R - \frac{1}{2}v_S - \frac{1}{2}v_T\right) + j\left(\frac{\sqrt{3}}{2}v_S - \frac{\sqrt{3}}{2}v_T\right)\right\} \quad \text{Formula 2}$$

$$\begin{bmatrix} v_\alpha \\ v_\beta \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} v_R \\ v_S \\ v_T \end{bmatrix} \quad \text{Formula 3}$$

Here, the instantaneous value vector vαβ is a vector that rotates at an angular velocity ω in a fixed coordinate system (αβ axis) based on an a phase.

Relations among the system instantaneous line voltages vRS and vST actually measured by the voltage detector 4 and instantaneous phase voltages vR, vS, and vT are as below.

$$v_{RS} = v_R - v_S \quad \text{Formula 4}$$

$$v_{ST} = v_S - v_T \quad \text{Formula 5}$$

Therefore, the instantaneous value vector is obtained from the instantaneous line voltages by formulas below.

$$v_\alpha = \sqrt{\frac{2}{3}}\left(v_R - \frac{1}{2}v_S - \frac{1}{2}v_T\right) = \quad \text{Formula 6}$$

$$\sqrt{\frac{2}{3}}\left(v_R - v_S + \frac{1}{2}v_S - \frac{1}{2}v_T\right) = \sqrt{\frac{2}{3}}(v_{RS} + v_{ST})$$

$$v_\beta = \sqrt{\frac{2}{3}}\left(\frac{\sqrt{3}}{2}v_S - \frac{\sqrt{3}}{2}v_T\right) = \frac{1}{\sqrt{2}}v_{ST} \quad \text{Formula 7}$$

In addition, cos φ and sin φ are calculated by formulas below. Thus, the phase φ is obtained.

$$\cos\phi = \frac{v_\alpha}{\sqrt{v_\alpha^2 + v_\beta^2}} \quad \text{Formula 8}$$

$$\sin\phi = \frac{v_\beta}{\sqrt{v_\alpha^2 + v_\beta^2}} \quad \text{Formula 9}$$

The phase comparator 32 calculates the difference between the phase φ calculated from the instantaneous value of the system voltage and the phase φ' estimated by the PLL calculating circuit 31. Based on Euler's formula, a phase difference φ-φ' is represented by a formula below.

$$\sin(\phi-\phi') = \sin\phi\cos\phi' - \cos\phi\sin\phi' \quad \text{Formula 10}$$

When the phase difference φ-φ' is adequately small, this phase difference φ-φ' is substantially regarded as a phase difference.

The loop filter 34 calculates a frequency ωs of the electric power system from the phase difference calculated by the phase comparator 32. The system frequency can be calculated from the output (ωs) of the loop filter 34. A transfer function G (s) of the loop filter is represented by a formula below.

$$G(s) = K_P\left(1 + \frac{1}{sT_I}\right) \quad \text{Formula 11}$$

The accumulator 35 accumulates the estimated frequency ωs to calculate an estimate phase angle φ'.

Here, a dq coordinate system that rotates at ωt relative to the αβ coordinate system is assumed, and the voltage of the electric power system is calculated by dq conversion. To be specific, the voltage of the dq coordinate system is calculated by formulas below.

$$\dot{V}_{dq} = \varepsilon^{-j\omega t}\dot{V}_{\alpha\beta} \quad \text{Formula 12}$$

$$\begin{bmatrix} V_d \\ V_q \end{bmatrix} = \begin{bmatrix} \cos\omega t & \sin\omega t \\ -\sin\omega t & \cos\omega t \end{bmatrix} \begin{bmatrix} V_\alpha \\ V_\beta \end{bmatrix} \quad \text{Formula 13}$$

As above, the voltage/frequency/phase calculating portion 14 calculates the voltages Vd and Vq, the frequency ωs, and the phase φ from the instantaneous values vRS and vST of the line voltage output from the voltage detector 4.

2. Current Calculating Portion

The current calculating portion 13 receives as an input the phase φ, calculated by the voltage/frequency/phase calculating portion 14, to calculate currents Id and Iq by a formula below.

$$i_R + i_S + i_T = 0 \quad i_S = -i_R - i_T \quad \text{Formula 14}$$

Therefore, the current vector of the dq coordinate system is represented by a formula below.

$$\begin{bmatrix} I_d \\ I_q \end{bmatrix} = \begin{bmatrix} \cos\phi & \cos\left(\phi - \frac{2}{3}\pi\right) & \cos\left(\phi - \frac{4}{3}\pi\right) \\ -\sin\phi & -\sin\left(\phi - \frac{2}{3}\pi\right) & -\sin\left(\phi - \frac{4}{3}\pi\right) \end{bmatrix} \begin{bmatrix} i_R \\ i_S \\ i_T \end{bmatrix} \quad \text{Formula 15}$$

3. Active/reactive Electric Power Calculating Portion

The active/reactive electric power calculating portion 15 receives as inputs the voltages Vd and Vq and the currents Id and Iq, calculated by the voltage/frequency/phase calculating portion 14 and the current calculating portion 13, to calculate active electric power P and reactive electric power Q.

$$P = V_d I_d + V_q I_q$$

$$Q = -V_d I_q + V_Q I_d \quad \text{Formula 16}$$

4. Frequency Command Value Calculating Portion

Figure 3A:
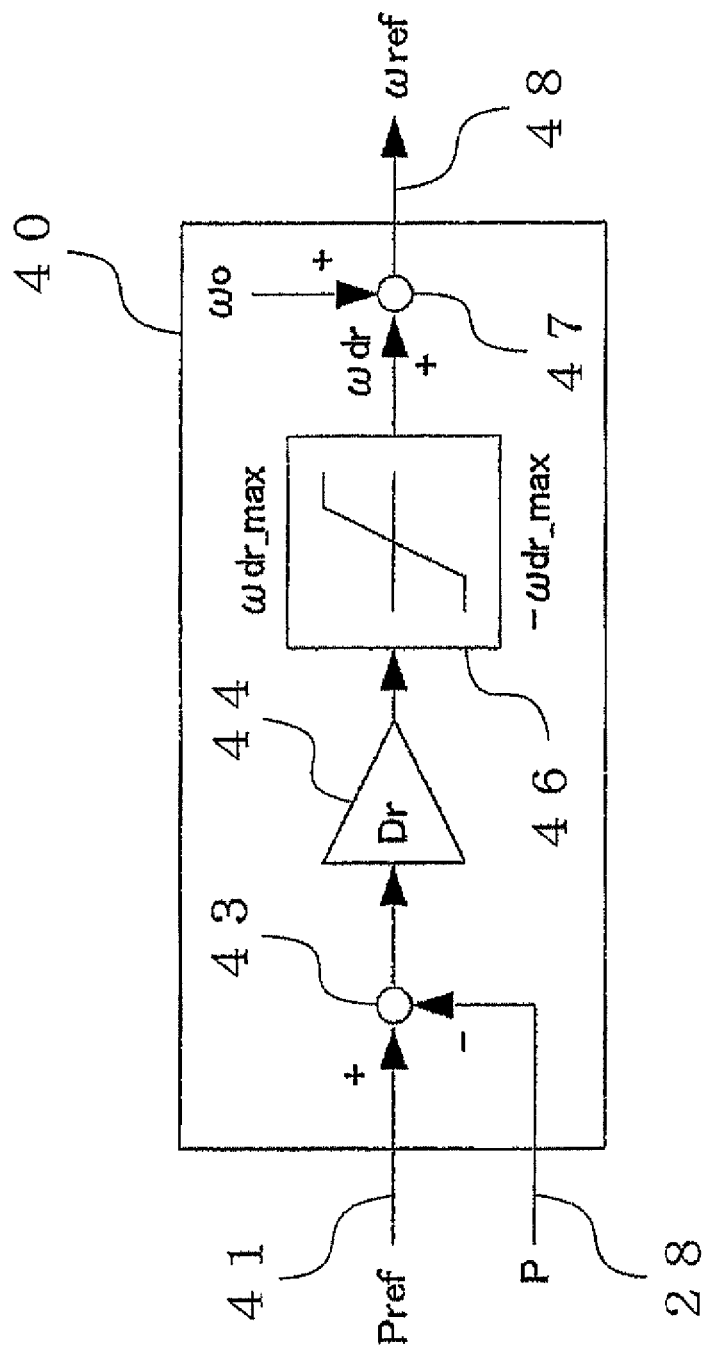
FIG. 3A is one example of a block diagram showing a calculating circuit of a frequency command value calculating portion in the control block of FIG. 1.

The frequency command value calculating portion 40 calculates a frequency command value ωref by proportional control from a difference between an active electric power command value Pref and the active electric power P. FIG. 3A is one example of a block diagram showing a calculating circuit of the frequency command value calculating portion 40 in the control block of FIG. 1. To be specific, as shown in FIG. 3A, a subtracter 43 subtracts the active electric power P from the active electric power command value Pref to output the obtained value to a proportional controller 44. The proportional controller 44 multiplies the output of the subtracter 43 by a proportional gain Kv to output the obtained value to an upper and lower limiter 46 located at the next stage. Then, the output of the proportional controller 44 is limited between ωdr_max and ωdr_min by the upper and lower limiter 46, and a frequency reference value ωo is added to the output of the upper and lower limiter 46 by an adder 47. The adder 47 outputs the obtained value as a frequency command value ωref. For example, 60 Hz is selected as the frequency reference value ωo.

Figure 3B:
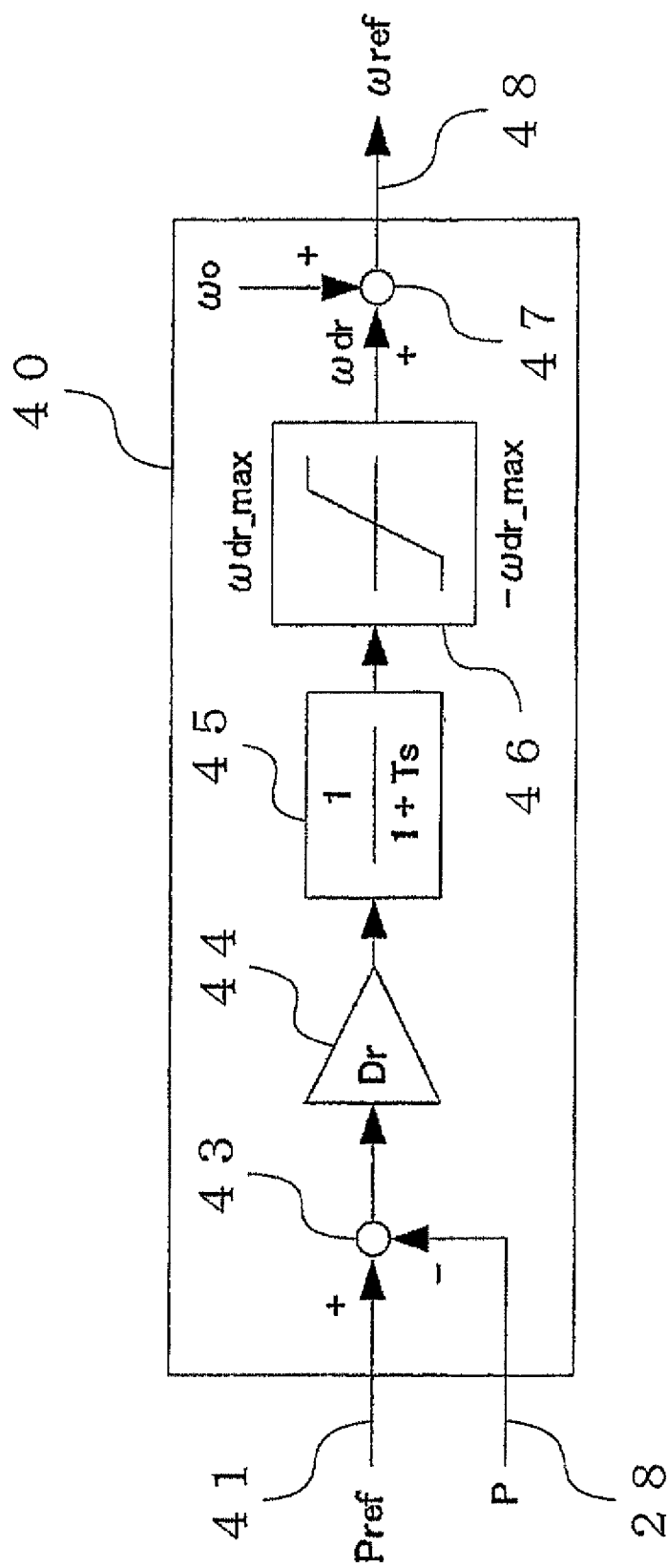
FIG. 3B is another example of the block diagram showing the calculating circuit of the frequency command value calculating portion in the control block of FIG. 1.

FIG. 3B is another example of the block diagram showing the calculating circuit of the frequency command value calculating portion 40 in the control block of FIG. 1. To be specific, as shown in FIG. 3B, a first-order lag calculation unit 45 may be provided between the proportional controller 44 and the upper and lower limiter 46 instead of the configuration shown in FIG. 3A. The proportional gain Kv is adjusted such that predetermined drooping characteristics of the frequency relative to the active electric power are set.

5. Internal Electromotive Voltage Command Value Calculating Portion

Figure 5A:
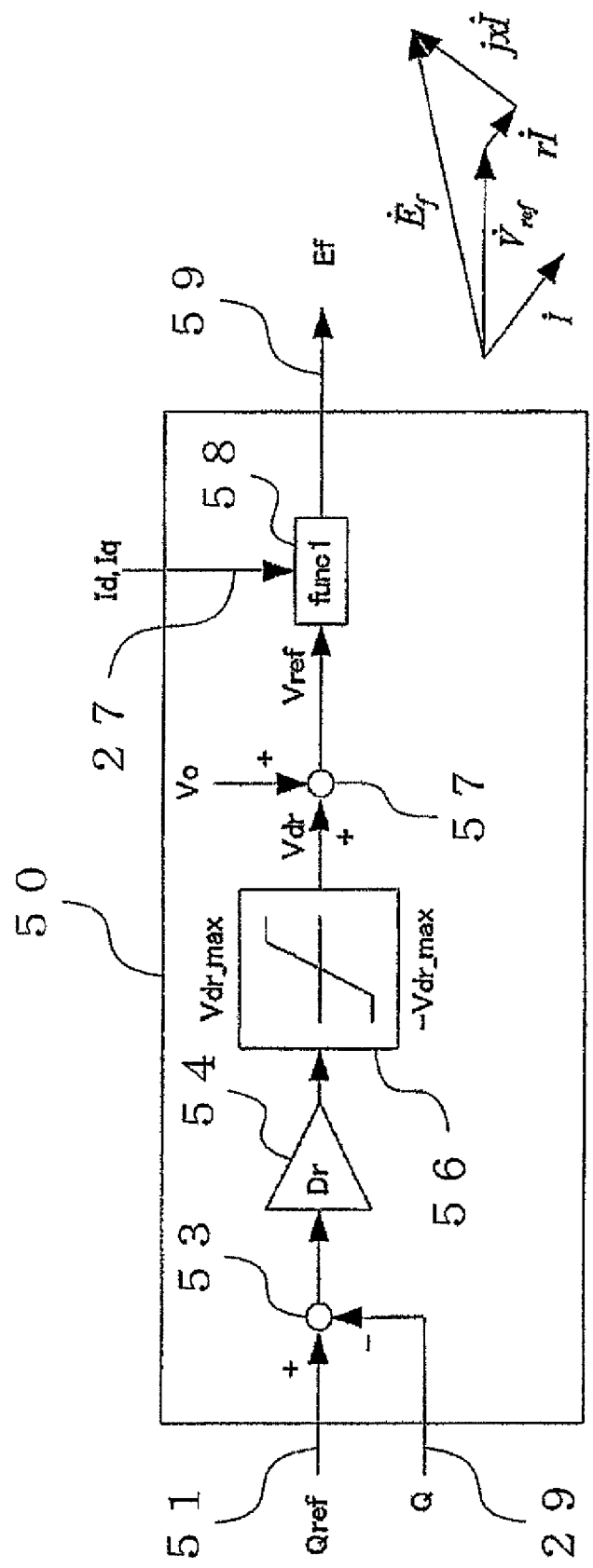
FIG. 5A is one example of a block diagram showing a calculating circuit of an internal electromotive voltage command value calculating portion in the control block of FIG. 1.

FIG. 5A is one example of a block diagram showing a calculating circuit of the internal electromotive voltage command value calculating portion 50 in the control block of FIG. 1. As shown in FIG. 5A, the internal electromotive voltage command value calculating portion 50 calculates an internal electromotive voltage command value Ef by proportional control from a difference between a reactive electric power command value Qref and the reactive electric power Q. Specifically, a subtracter 53 subtracts the reactive electric power Q from the reactive electric power command value Qref to output the obtained value to a proportional controller 54. The proportional controller 54 multiplies the output of the subtracter 53 by a proportional gain Kf to output the obtained value to an upper and lower limiter 56 located at the next stage. Then, the output of the proportional controller 54 is limited between Vdr_max and Vdr_min by the upper and lower limiter 56, and an adder 57 adds a voltage reference value Vo to the output of the upper and lower limiter 56 to obtain a voltage target value Vref. The voltage target value Vref is output to a function calculation unit 58 to be subjected to a calculation represented by a formula below. Then, the function calculation unit 58 outputs the internal electromotive voltage command value Ef.

$$E_{fd} = V_{ref} + rI_d - xI_q \quad \text{Formula 17}$$

$$E_{fq} = rI_q + xI_d$$

$$E_f = \sqrt{E_{fd}^2 + E_{fq}^2}$$

Figure 6A:
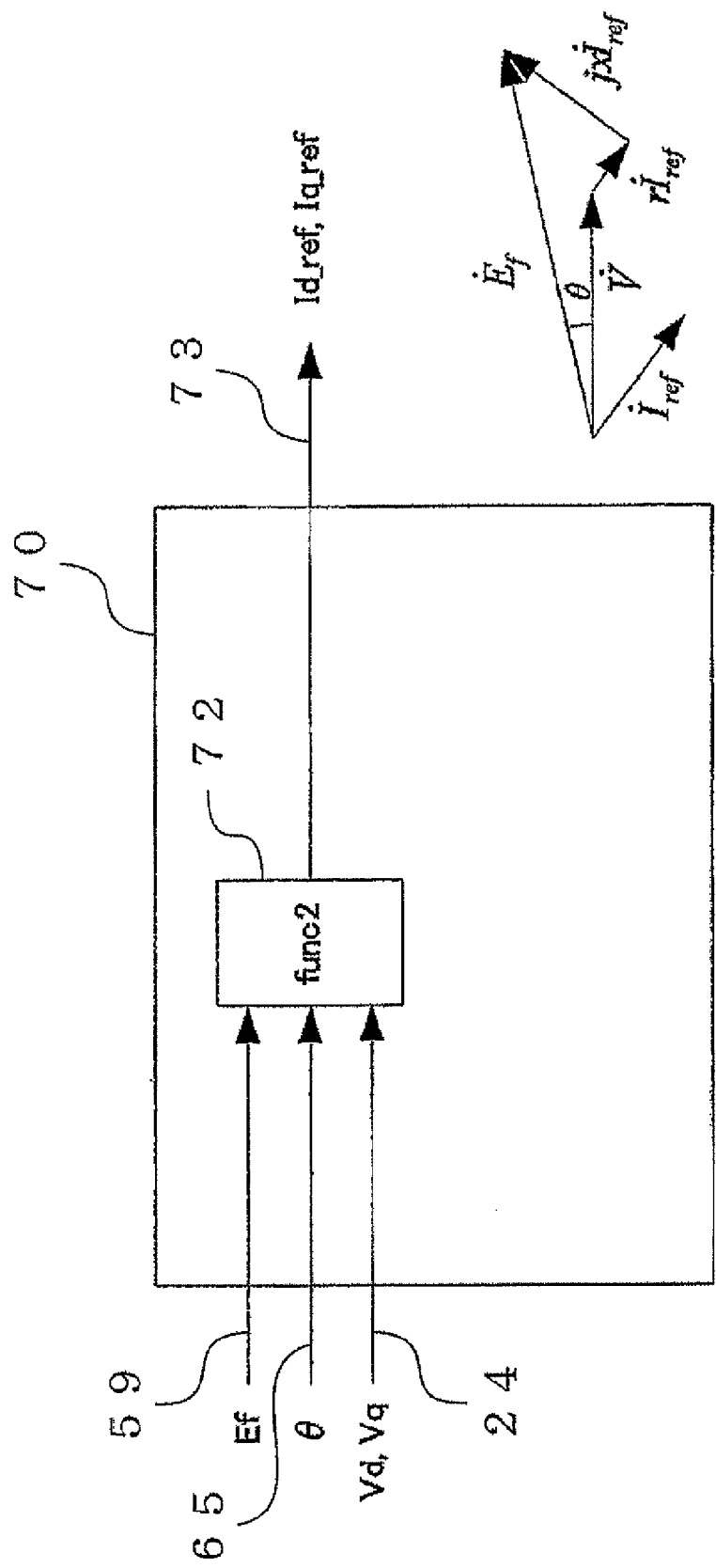
FIG. 6A is one example of a block diagram showing a calculating circuit of a current command value calculating portion in the control block of FIG. 1.
Figure 6B:
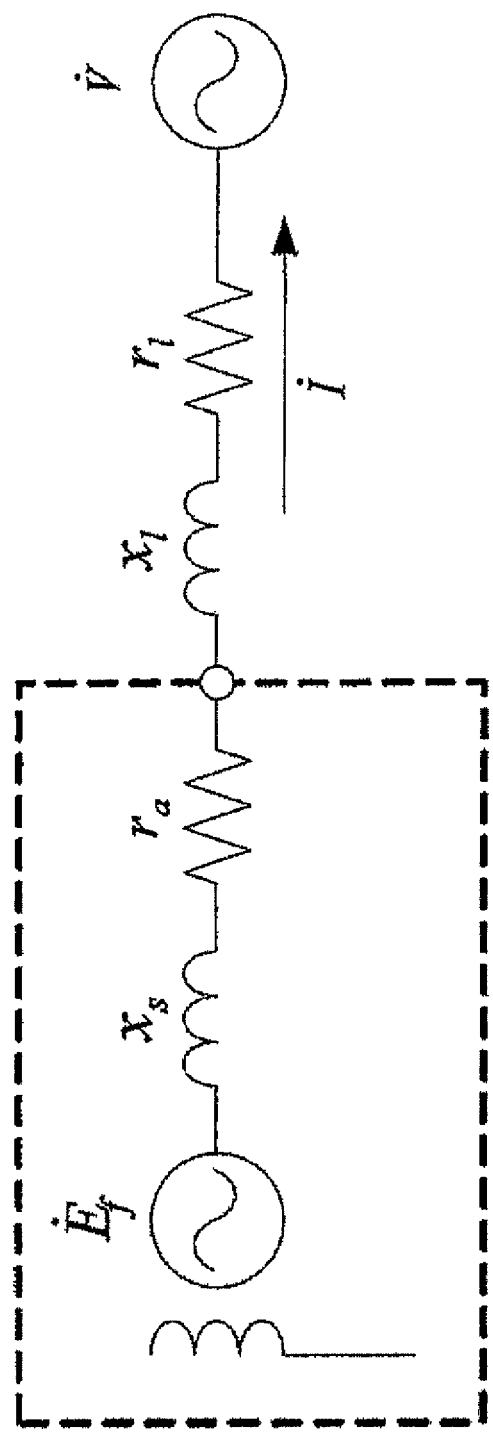
FIG. 6B is a diagram showing a virtual voltage control type electric power converter.

It is possible to say that the internal electromotive voltage command value Ef obtained by the above formula is obtained by subtracting a voltage drop caused by a total impedance (r, x) from the voltage target value Vref that is the output of the second adder 57, the total impedance (r, x) being a sum of an internal impedance of the power storage facility and an external impedance between the power storage facility and the power supply system (see FIG. 6B). FIG. 6B is one example of a system diagram showing a virtual voltage control type electric power converter.

Figure 5B:
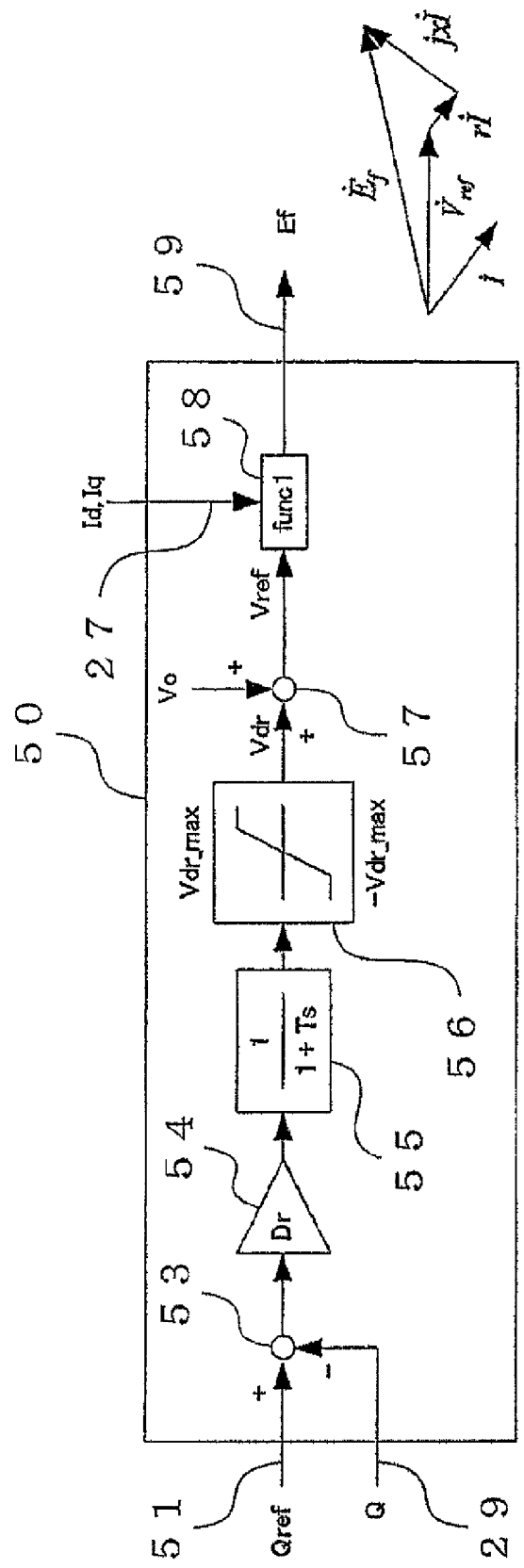
FIG. 5B is another example of the block diagram showing the calculating circuit of the internal electromotive voltage command value calculating portion in the control block of FIG. 1.

FIG. 5B is another example of the block diagram showing the calculating circuit of the internal electromotive voltage command value calculating portion in the control block of FIG. 1. To be specific, as shown in FIG. 5B, a first-order lag calculation unit 55 may be provided between the proportional controller 54 and the upper and lower limiter 56 instead of the configuration shown in FIG. 5A. The proportional gain Kf is adjusted such that predetermined drooping characteristics of the output voltage relative to the reactive electric power are set.

6. Internal Phase Angle Calculating Portion

Figure 4:
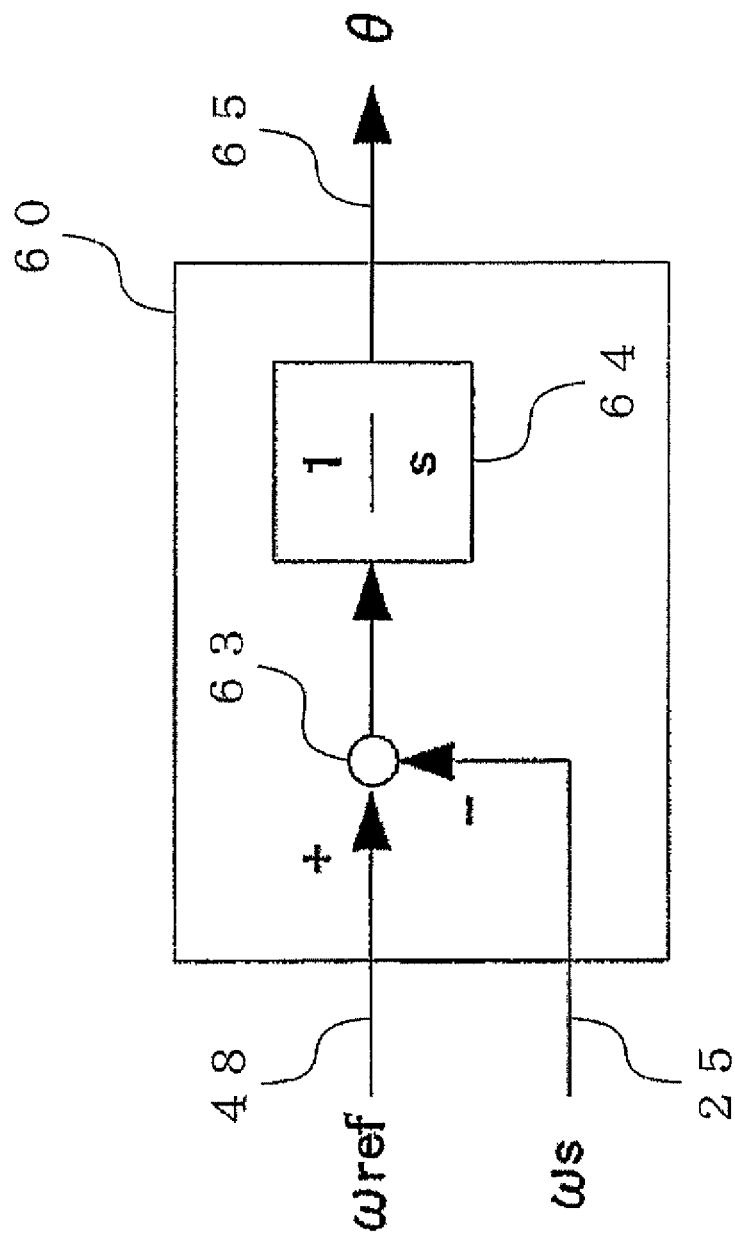
FIG. 4 is one example of a block diagram showing a calculating circuit of an internal phase angle calculating portion in the control block of FIG. 1.

FIG. 4 is one example of a block diagram showing a calculating circuit of the internal phase angle calculating portion in the control block of FIG. 1. As shown in FIG. 4, the internal phase angle calculating portion 60 calculates an internal phase angle θ from a difference between the frequency command value ωref and the frequency ωs. A subtracter 63 calculates the difference between the frequency command value ωrd and the frequency ωs, and the obtained difference is accumulated by an accumulator 64 located at the next stage. Then, the accumulator 64 outputs the obtained value as the internal phase angle θ.

7. Current Command Value Calculating Portion

FIG. 6A is one example of a block diagram showing a calculating circuit of the current command value calculating portion in the control block of FIG. 1. As shown in FIG. 6A, the current command value calculating portion 70 receives as inputs the internal electromotive voltage command value Ef, the internal phase angle θ, and the voltages Vd and Vq, and these inputs are subjected to a calculation represented by a formula below by a function calculation unit 72. Then, the function calculation unit 72 outputs current command values Id_ref and Iq_ref to the electric power converter control portion 16.

$$\Delta V_d + j\Delta V_q = (E_f \cos\theta - V_d) + j(E_f \sin\theta - V_q) \quad \text{Formula 18}$$

$$I_{d\_ref} = \frac{1}{r^2 + x^2}(r\Delta V_d + x\Delta V_q)$$

$$I_{q\_ref} = \frac{1}{r^2 + x^2}(r\Delta V_q - x\Delta V_d)$$

In a case where the total impedance is connected between the power supply having the system voltage measured by the voltage measuring unit and the power supply having an internal electromotive voltage command value voltage, the current value obtained by the above formula is the value of a current flowing through the total impedance. This current value is output as a current command value from the current command value calculating portion 70 (see FIG. 6B).

Here, actual internal impedances ra and xs of a power storage facility are substantially equal to zero, and total impedances r(=ra+rl) and x (=xs+xl) are respectively, substantially equal to external impedances rl and xl between the power storage facility and the power supply system. However, as described above, when calculating the internal electromotive voltage command value Ef and the current command values Id_ref and Iq_ref, the total impedance that is the sum of the internal impedance of the power storage facility and the external impedance between the power storage facility and the power supply system is used. Especially, the stable operation can be performed in such a manner that: the internal impedance of the power storage apparatus is virtually increased; the total impedance is calculated; and the internal electromotive voltage command value Ef and the current command values Id_ref and Iq_ref are calculated by using this virtual impedance. This is because the reason why the output balance is significantly lost by the small voltage difference between the electric power converters in a case where a plurality of voltage control type electric power converters are operated in parallel is because the impedance of the electric power converter is low.

To be specific, the current command value calculating portion 70 estimates the current value output to the electric power system in a case where the virtual voltage control type electric power converter has generated the internal electromotive voltage calculated by the internal electromotive voltage command value calculating portion and the internal phase angle calculating portion.

With this, an apparent impedance of the electric power converter increases, so that the system is prevented from becoming unstable at the time of the interconnected operation with the electric power system and the parallel operation of the electric power converters.

8. Electric Power Converter Control Portion

The electric power converter control portion 16 receives as inputs the voltages Vd and Vq and the phase φ calculated by the voltage/frequency/phase calculating portion 14, the currents Id and Iq calculated by the current calculating portion 13, and the current command values Id_ref and Iq_ref calculated by the current command value calculating portion 70 and outputs the gate drive signal 20 such that the output current of the electric power conversion circuit 6 corresponds to the current command value calculated by the current command value calculating portion 70.

In a case where the secondary battery monitoring device 18 has detected an abnormality of the secondary battery 5, the secondary battery monitoring device 18 outputs a battery abnormality signal through the wire 23 to the electric power converter control portion 16 of the system control device 11 to stop the transmission of the gate drive signal 20. With this, the operation of the electric power conversion circuit 6 is stopped, so that the secondary battery 5 is protected. Examples of the abnormality of the secondary battery include overcurrent, voltage reduction, overvoltage, overcharge, overdischarge, battery temperature abnormality, battery pressure abnormality, and device abnormality.

Figure 10:
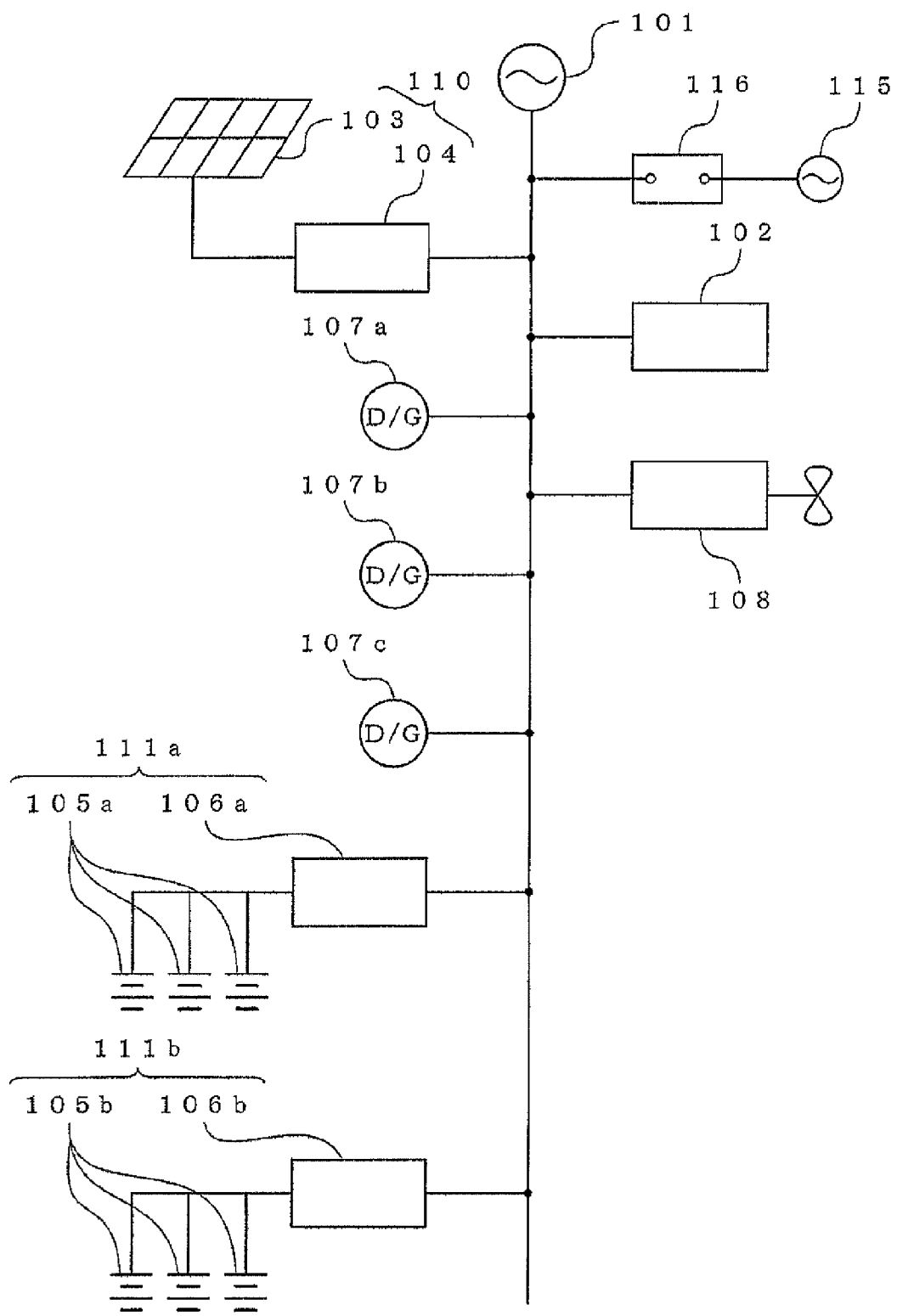
FIG. 10 is one example of a diagram of a power supply system for the combined power generation system according to the embodiment of the present invention.

FIG. 10 is one example of a diagram of the power supply system for the combined power generation system according to the embodiment of the present invention. A ship power supply system 101 is not a specific system and is, so to speak, constituted by wires and various power generators, load facilities, and the like connected to the wires.

Although three-phase AC power flows in the ship power supply system 101 (hereinafter simply referred to as a "power supply system"), FIG. 10 shows a single-wire system diagram for simplicity. The power supply system shown in FIG. 10 is provided in a ship, but the present invention is also applicable to the micro grid.

The power supply system 101 uses a three-phase alternating current having a nominal voltage of 440 V and a nominal frequency of 60 Hz, and various facilities are connected to the electric power system. To be specific, a solar power generator 110 constituted by a solar battery unit 103 and an electric power converting unit 104, a power storage facility 111 constituted by a secondary battery 105 and an electric power converter 106, and three diesel power generators 107a, 107b, and 107c are connected to a power supply side of the power supply system 101 of FIG. 10. The electric power converter 106 is constituted by the electric power conversion circuit 6 and its control devices 11 and 16.

A ship electric power load 102 and a bow thruster 108 are connected to a load side of the power supply system 101 of FIG. 10. The ship electric power load 102 denotes lighting and air conditioning in a ship and electric power consumed in the ship. The bow thruster 108 is provided to cause the ship to move to a pier without help of a tugboat when the ship comes into a port. The bow thruster 108 is driven by a large induction motor.

Basically, electric power necessary in the ship is generated by a diesel power generator 107. In some cases, the natural energy of the solar power generator 110 or the like is used. However, in the case of the natural energy, it is normally impossible to control generated electric power, so that the power supply system becomes unstable. The power storage facility 111 according to the present invention is provided so as to compensate the transient load changes (such as the operation stop of the bow thruster 108) that the diesel power generators 107 cannot follow and the disturbances of the electric power system by the solar power generator 110.

While the ship is moored at the pier, the electric power necessary in the ship is supplied from the commercial electric power system. Therefore, after the ship is moored at the pier, a circuit breaker 116 for the system interconnection is closed in cooperation with a synchronizing control device (not shown). With this, the power supply system 101 is connected to a commercial electric power system 115 through the circuit breaker 116.

Here, the operations of the single system control device 11 will be explained. To be specific, the following will explain the operations of the control device 11 whose process amount has been changed in a case where the other electric power generation facility is not connected in FIG. 1.

In a case where ship loads (102 and 108) increase in the ship power supply system 101, the frequency ωs decreases by the droop characteristics of FIG. 3A or 3B. In a case where the frequency ωs decreases, the output of the subtracter 63 that has been zero in a set state in the internal phase angle calculating portion 60 changes into a positive value. Then, the output of the accumulator 64 increases, and the internal phase angle θ increases. With this, the current command value Id_ref calculated by the current command value calculating portion 70 increases, and a d axis current output from the electric power converter 106 increases. As a result, the active electric power P increases, and the decreased frequency ωs increases to try to return to an original value. However, the frequency ωs does not return to the original value that is a value before the increase in the ship loads.

On the other hand, the output of the subtracter 43 of the frequency command value calculating portion 40 decreases by the increase in the active electric power P. As a result, the frequency command value cord that is the output of the frequency command value calculating portion 40 decreases. With this, the frequency ωs and the frequency command value ωref are balanced, so that the output of the subtracter 63 of the internal phase angle calculating portion 60 becomes zero. Thus, the increase in the output of the accumulator 64 stops, and the internal phase angle θ is set to the value after the increase in the ship loads.

When the consumption of the reactive electric power Q by the ship loads (102 and 108) increases, the internal electromotive voltage command value Ef that is the output of the internal electromotive voltage command value calculating portion 50 increases, and the current command value Iq_ref that is the output of the current command value calculating portion 70 increases. As a result, the electric power converter 106 supplies the required reactive electric power Q. In this period, the load power factor of the ship power supply system 101 temporarily decreases.

Next, the transient response of the system control device 11 in a case where the diesel power generator 107 is connected to the power supply system 1 will be explained in detail in reference to FIGS. 3A and 5A using as an example a case where the ship loads (102 and 108) have been increased.

In a case where the ship loads (102 and 108) increase, and this increases the active electric power P, the increased amount of the active electric power is transiently covered by the diesel power generator 107. To be specific, in a case where the active electric power P increases, the frequency command value ωref decreases, and this decreases the internal phase angle θ. Thus, the output of the electric power converter 106 decreases adversely. As a result, the decreased amount of the output of the electric power converter 106 and the increased amounts of the ship loads (102 and 108) are covered by the diesel power generator 107. No problem occurs when the output (power supply capacity) of the diesel power generator 107 is adequately large. However, for example, in a case where the power supply capacity of the prime mover power generator is small as in the case of the micro grid, the prime mover power generator is overloaded and stops its operation in some cases. In addition, if the prime mover power generator is operated in an overloaded state, the fuel efficiency deteriorates.

Such a phenomenon occurs by the response lag caused due to the inertia moment of the diesel power generator 107 (the same is true for the prime mover power generator). In a steady state, the frequency decreases as described above, and the diesel power generator 107 and the electric power converter 106 share the loads in accordance with the predetermined droop characteristics, so that no problem occurs. Therefore, if there is no difference between the output delays of the diesel power generator 107 and the electric power converter 106, there is no possibility that the diesel power generator 107 is transiently overloaded.

Figure 7:
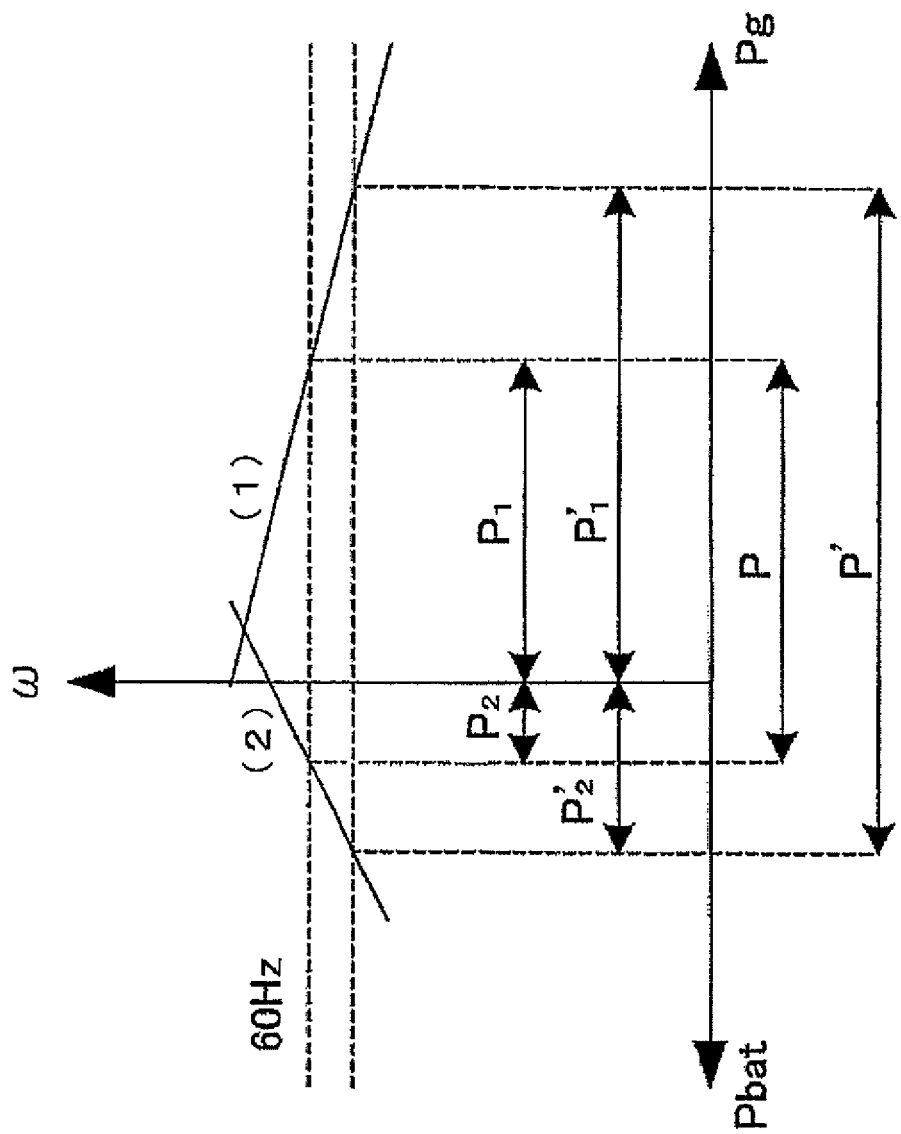
FIG. 7 is a diagram for explaining drooping characteristics in a case where a prime mover power generator is connected to an electric power system.

FIG. 7 shows a situation where the diesel power generator 107 and the electric power converter 106 share the loads. In FIG. 7, a vertical axis denotes the frequency, a horizontal axis denotes the electric power, a graph at a horizontal axis Pg side denotes the output characteristics of the diesel power generator 107, and a graph at a horizontal axis Pbat side denotes the output characteristics of the electric power converter 106. At first, a load P is shared such that the diesel power generator 107 covers a load P1, and the electric power converter 106 covers a load P2. Then, in a case where the ship load is increased to a load P', steadily, the output of the diesel power generator 107 changes in accordance with the droop characteristics shown by a curved line (1) to become a load P'1, and the output of the electric power converter 106 changes in accordance with the droop characteristics shown by a curved line (2) to become a load P'2.

However, in a transient state, as described above, the frequency ωs does not decrease immediately due to the inertia moment of the diesel power generator 107, so that the output of the electric power converter 106 remains at substantially the load P2. The shortfall of the active electric power is covered by the diesel power generator 107.

As shown in FIGS. 3B and 5B, by providing the first-order lag calculation unit 45 between the proportional controller 44 and the upper and lower limiter 46 and providing the first-order lag calculation unit 55 between the proportional controller 54 and the upper and lower limiter 56, the response of the electric power converter 106 lags to be able to correspond to the response of the diesel power generator 107. By adjusting the magnitude of the first-order lag, the load sharing between the electric power converter 106 and the diesel power generator 107 can be appropriately maintained even in the transient state. Preferably, the time constants of the first-order lag calculation units 45 and 55 are set in accordance with the inertia moment of the diesel power generator 107. Preferably, the time constant of the response of the prime mover power generator may be set as each of the time constants of the first-order lag calculation units 45 and 55. For example, each of the time constants of the first-order lag calculation units 45 and 55 may be set to one second as a specific numerical value.

In a case where all of the three diesel power generators 107 are in a stop state, the electric power necessary in the ship is covered by two power storage facilities 111. At this time, in a case where the consumption of the active electric power P by the ship loads (102 and 108) increases, the increased amount is covered by power storage facilities 111a and 111b in accordance with a droop rate determined based on the proportional gain Kv of the proportional controller 44 of the frequency command value calculating portion 40. As with the above, the changed amount of the reactive electric power Q is covered by the power storage facilities 111a and 111b in accordance with the droop rate determined based on the proportional gain Kf of the proportional controller 54 of the internal electromotive voltage command value calculating portion 50.

Since the electric power converter 106 explained above has both the current control type characteristics and the voltage control type characteristics, the switching of the control method is not required.

The following effects can be obtained by providing the electric power converter according to the present invention.

1. The stand-alone power supply system and the commercial electric power system on land can be interconnected without switching the control method. In addition, in the stand-alone power supply system, the diesel power generator and the power storage facility using the secondary battery can be interconnected. Further, the self-sustaining operation only by the power storage facility using the secondary battery can be performed by the same control method, so that handleability improves.

2. The control of the voltage and frequency during the self-sustaining operation can be performed in the same manner as that of the diesel power generator, so that handleability improves.

Test Results

Figure 8A:
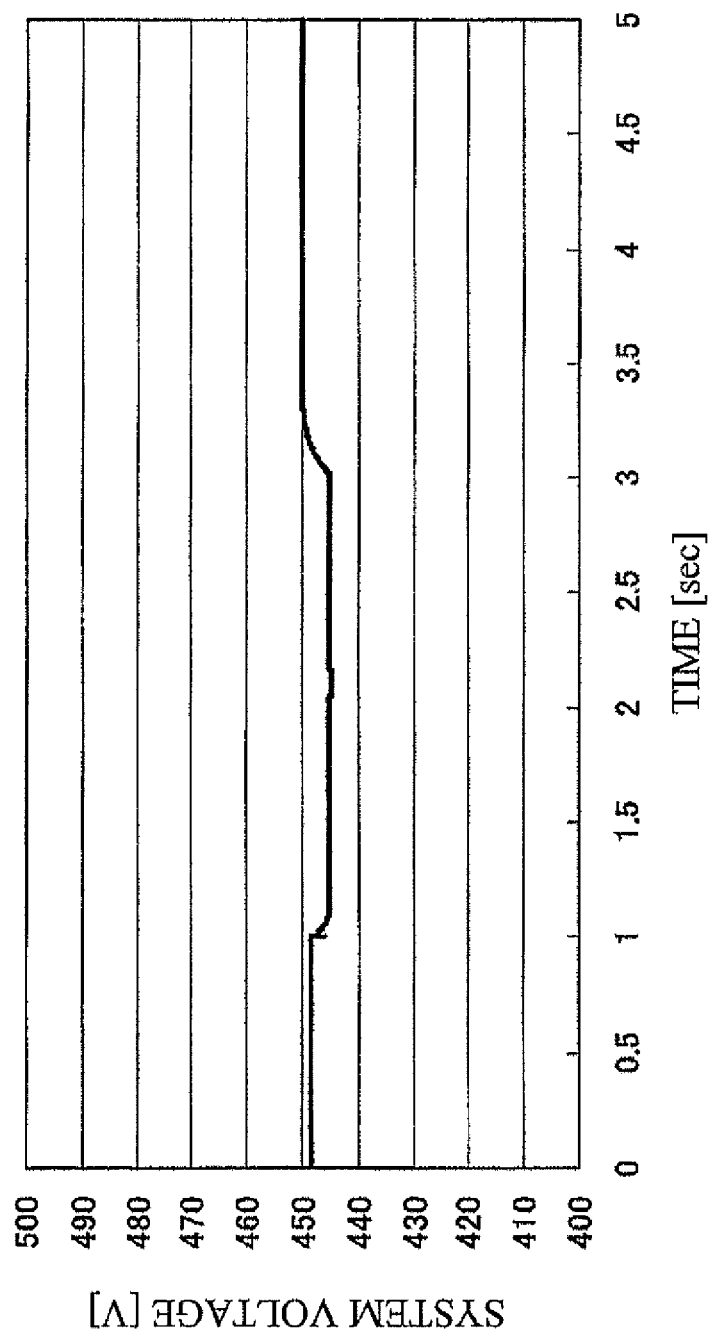
FIG. 8A is a graph showing a result of a simulation test of the system voltage in a case where two electric power converters for the combined power generation system according to the present invention are operated in parallel.
Figure 8B:
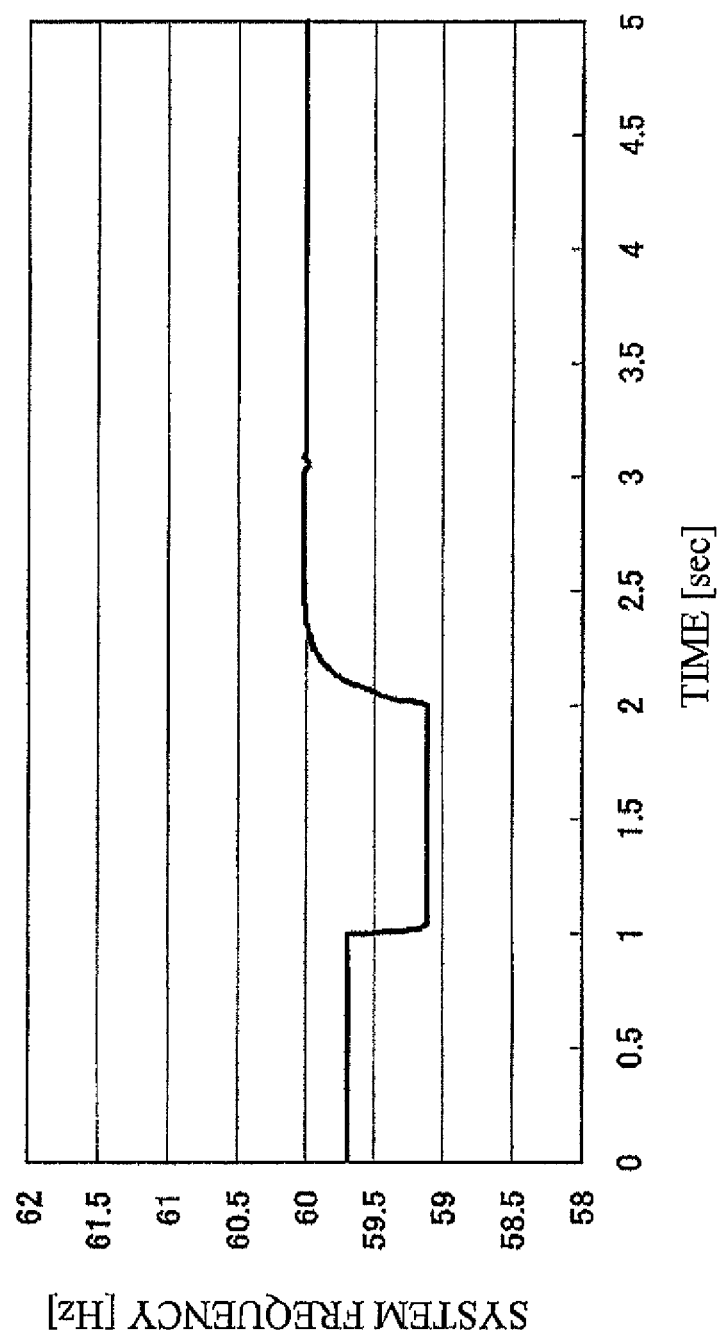
FIG. 8B is a graph showing a result of a simulation test of the system frequency in a case where two electric power converters for the combined power generation system according to the present invention are operated in parallel.
Figure 8D:
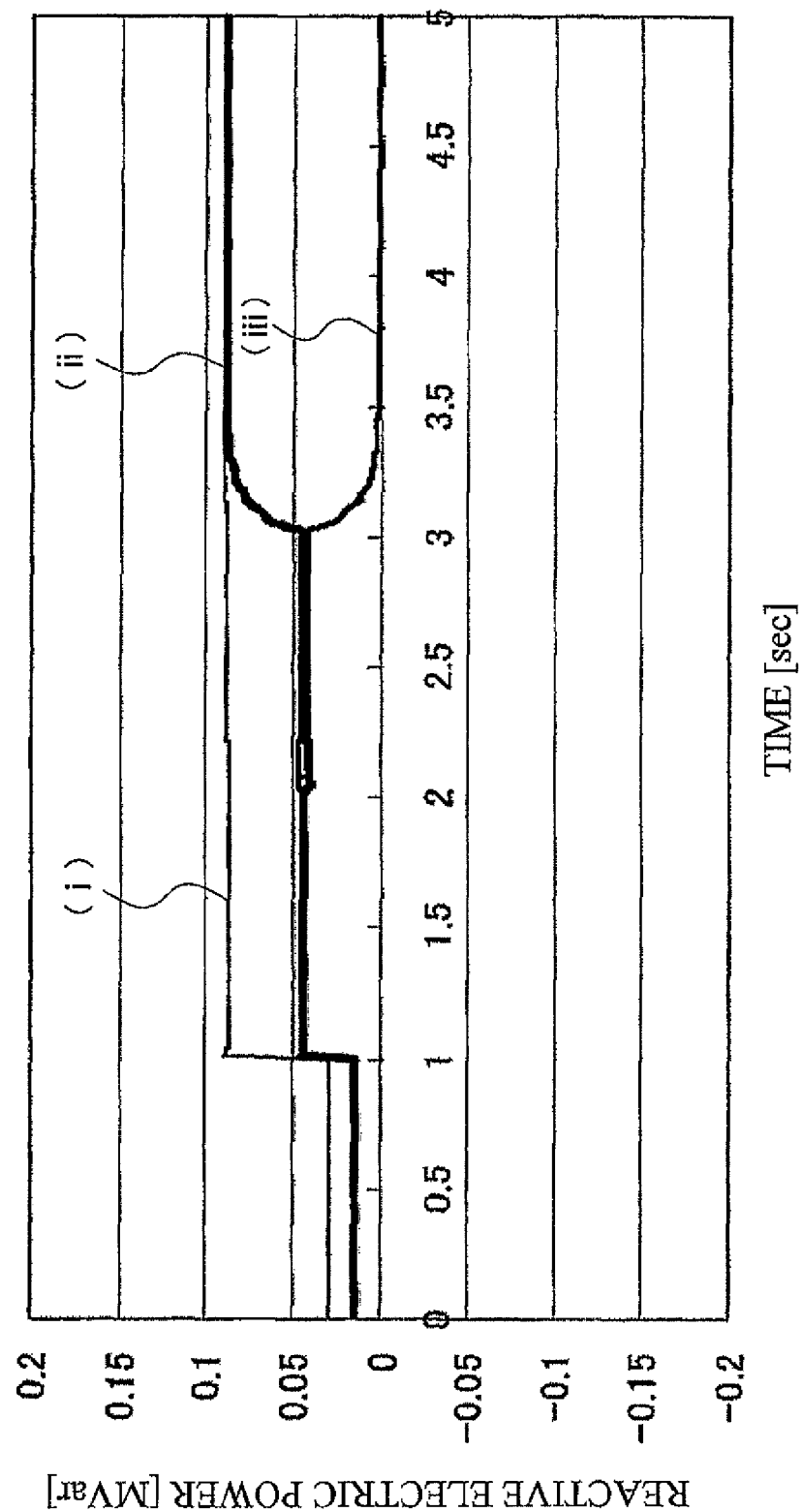
FIG. 8D is a graph showing a result of a simulation test of reactive electric power in a case where two electric power converters for the combined power generation system according to the present invention are operated in parallel.

FIGS. 8A, 8B, 8C, and 8D show simulation results obtained when the load change has occurred in a case where the ship power supply is only the power storage facility 111. FIG. 8A is a graph showing a result of a simulation test of the system voltage in a case where two electric power converters for the combined power generation system according to the present invention are operated in parallel. FIG. 8B is a graph showing a result of a simulation test of the system frequency in a case where two electric power converters for the combined power generation system according to the present invention are operated in parallel. FIG. 8C is a graph showing a result of a simulation test of the active electric power in a case where two electric power converters for the combined power generation system according to the present invention are operated in parallel. FIG. 8D is a graph showing a result of a simulation test of the reactive electric power in a case where two electric power converters for the combined power generation system according to the present invention are operated in parallel. In FIG. 8C, (i) denotes load active electric power, (ii) denotes active electric power of one of two electric power converters, and (iii) denotes active electric power of the other electric power converter. In FIG. 8D, (i) denotes load reactive electric power, (ii) denotes reactive electric power of one of two electric power converters, and (iii) denotes reactive electric power of the other electric power converter. According to the simulation results of FIGS. 8A to 8D, The diesel power generator 107 is in a stop state, and the electric power converters 106a and 106b are operated in parallel. The electric power command of each electric power converter 106 is originally 0 kW and 0 kVar.

Regarding the droop setting of the frequency and the voltage, each of the three diesel power generators 107 and the two electric power converters 106 is set to 5%.

At the time of one second, the ship load increases from 40 kW, 30 kVar to 120 kW, 90 kVar. At the time of two seconds, the active electric power command value of the electric power converter 106a is changed to 120 kW. At the time of three seconds, the reactive electric power command value is changed to 90 kVar.

The output of the electric power converter 106 is determined by load power, not a command. In a case where two electric power converters 106a and 106b are operated in parallel, and the electric power command values of the electric power converters 106 are the same as each other, the electric power converters 106 equally share the load. In a case where one of the electric power command values is changed, the other output automatically changes in accordance with the change in the electric power command value. Therefore, by monitoring a steady difference and outputting the electric power command value corresponding to the steady difference, a control operation of maintaining steady-state values of the voltage and the frequency at rated values can be performed.

Figure 9A:
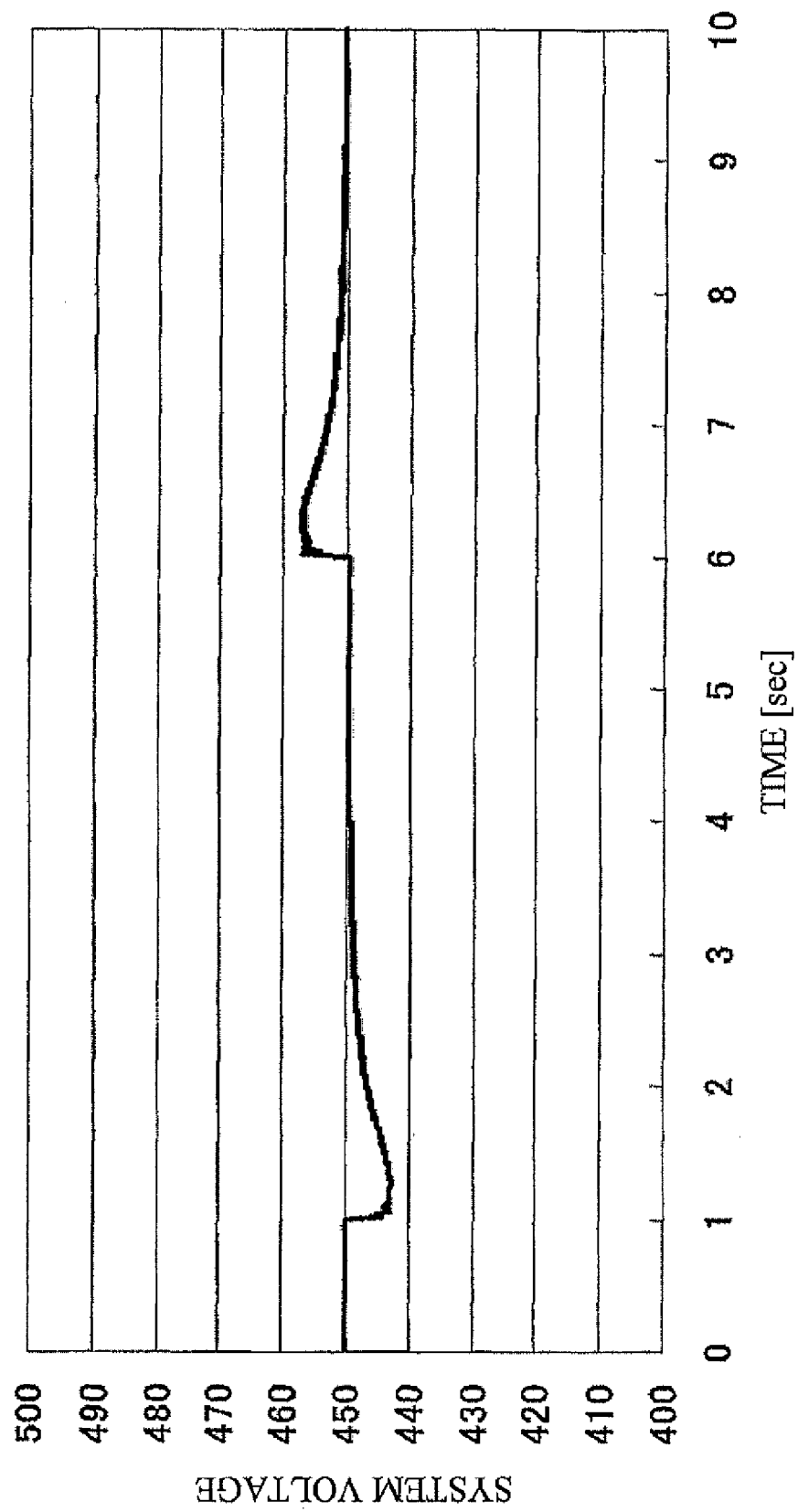
FIG. 9A is a graph showing a result of a simulation test of the system voltage in a case where the electric power converter for the combined power generation system according to the present invention and a diesel power generator are operated in parallel.
Figure 9B:
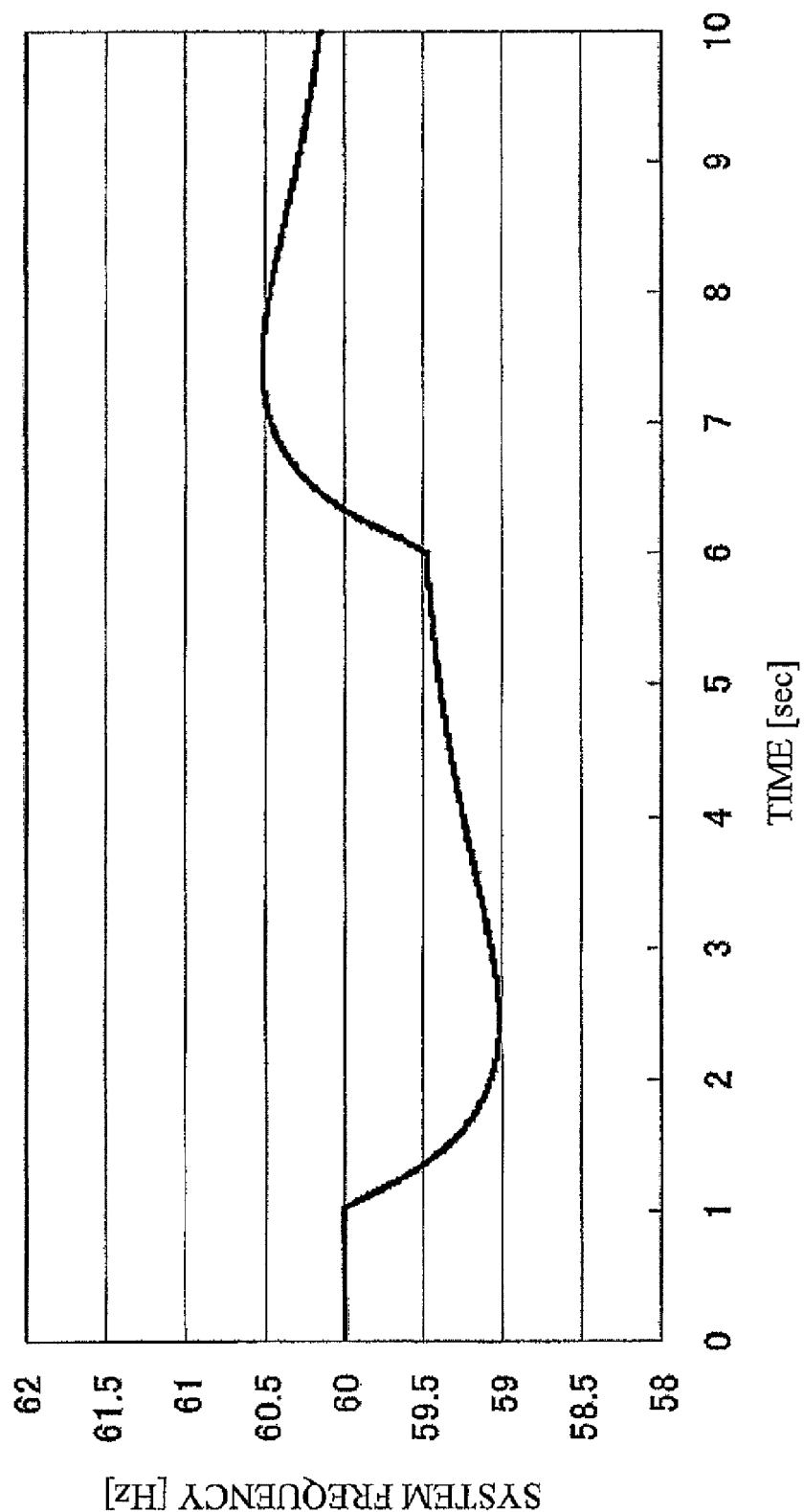
FIG. 9B is a graph showing a result of a simulation test of the system frequency in a case where the electric power converter for the combined power generation system according to the present invention and the diesel power generator are operated in parallel.
Figure 9C:
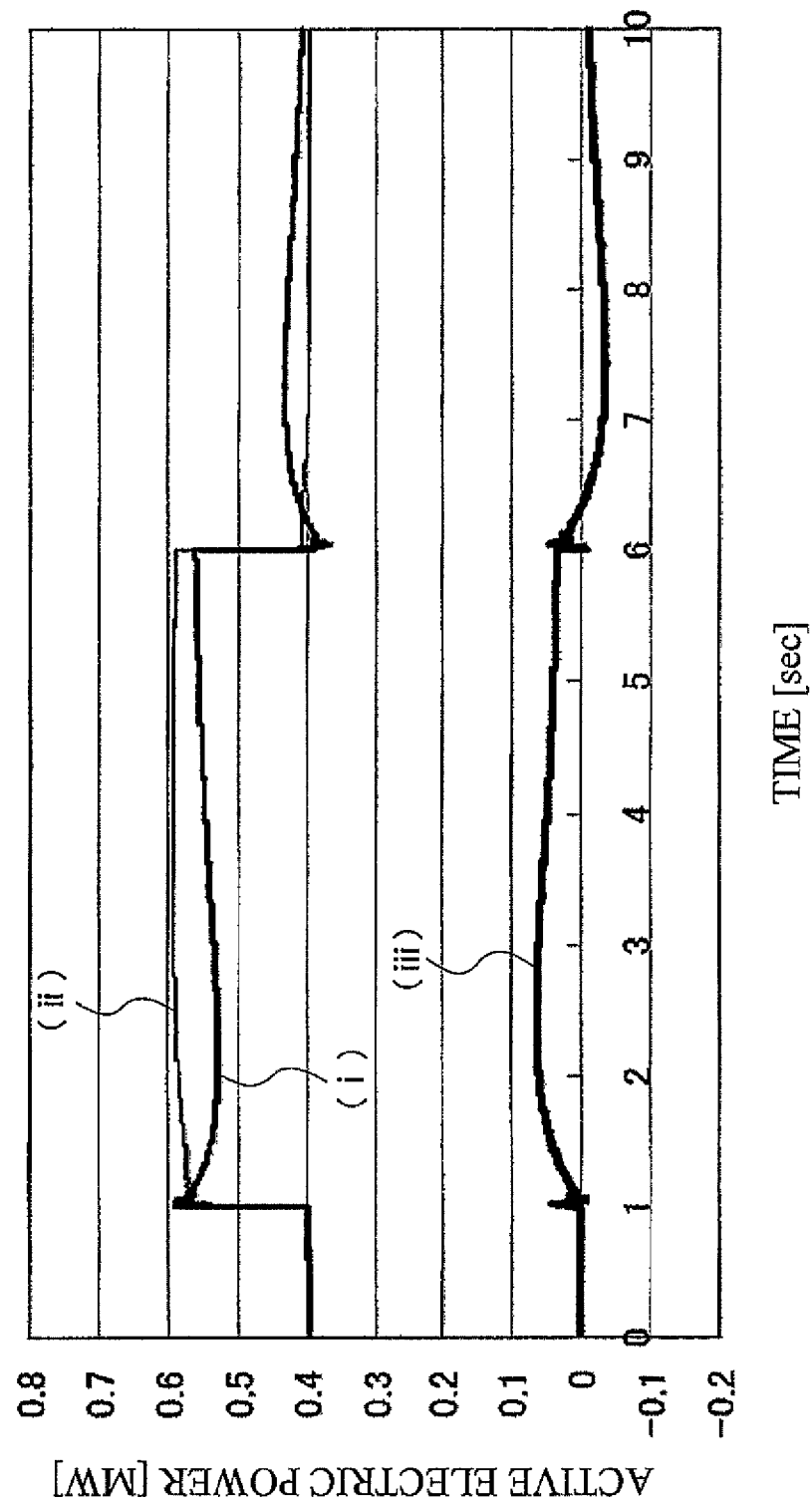
FIG. 9C is a graph showing a result of a simulation test of the active electric power in a case where the electric power converter for the combined power generation system according to the present invention and the diesel power generator are operated in parallel.
Figure 9D:
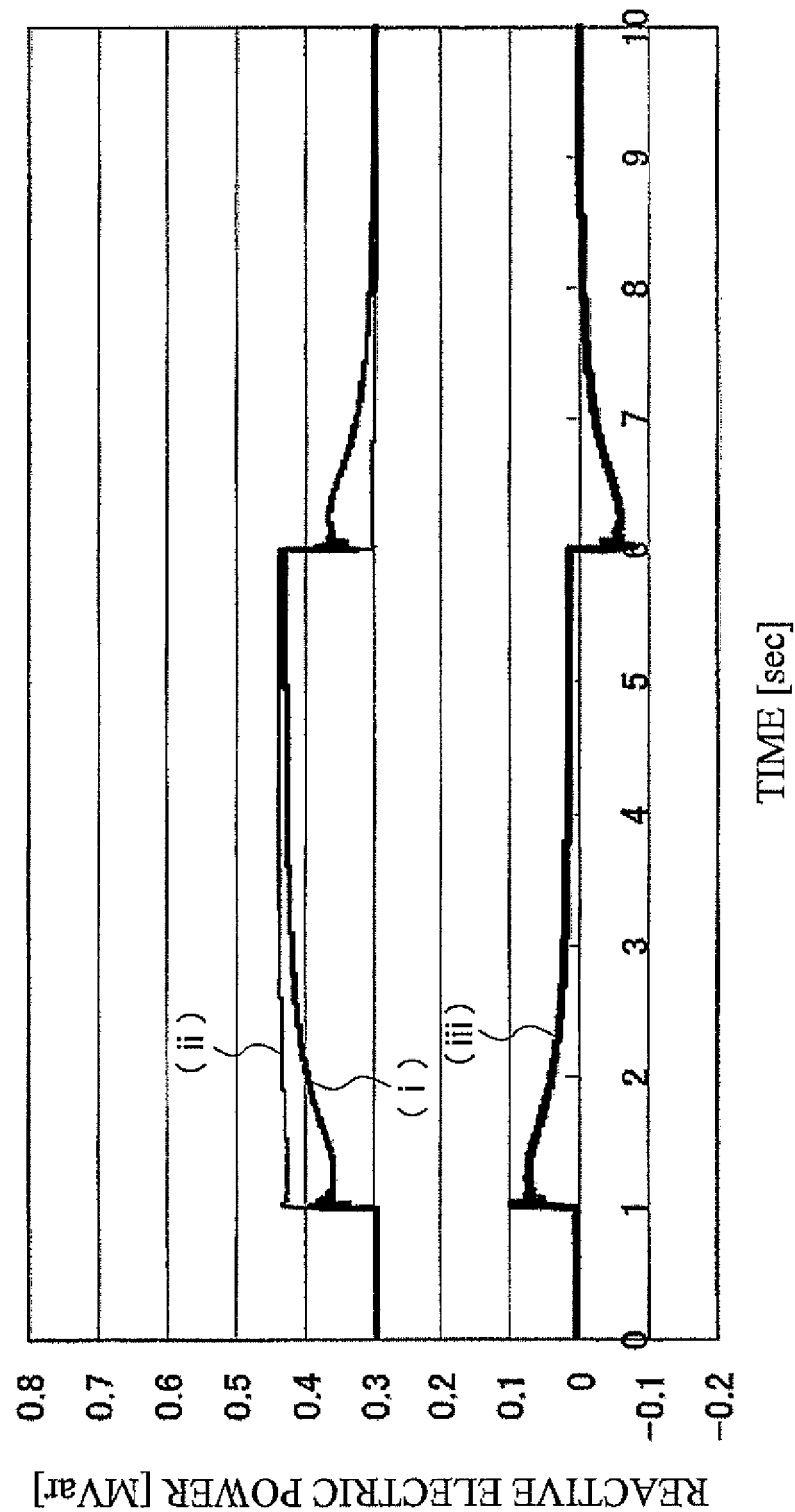
FIG. 9D is a graph showing a result of a simulation test of the reactive electric power in a case where the electric power converter for the combined power generation system according to the present invention and the diesel power generator are operated in parallel.

FIGS. 9A, 9B, 9C, and 9D show simulation results obtained when the load change has occurred in a case where the ship power supplies are the diesel power generator 107 and the power storage facility 111. Here, FIG. 9A is a graph showing a result of a simulation test of the system voltage in a case where the electric power converter for the combined power generation system according to the present invention and the diesel power generator are operated in parallel. FIG. 9B is a graph showing a result of a simulation test of the system frequency in a case where the electric power converter for the combined power generation system according to the present invention and the diesel power generator are operated in parallel. FIG. 9C is a graph showing a result of a simulation test of the active electric power in a case where the electric power converter for the combined power generation system according to the present invention and the diesel power generator are operated in parallel. FIG. 9D is a graph showing a result of a simulation test of the reactive electric power in a case where the electric power converter for the combined power generation system according to the present invention and the diesel power generator are operated in parallel. In FIG. 9C, (i) denotes the active electric power of the diesel power generator, (ii) denotes the load active electric power, and (iii) denotes the active electric power of the electric power converter. In FIG. 9D, (i) denotes the reactive electric power of the diesel power generator, (ii) denotes the load reactive electric power, and (iii) denotes the reactive electric power of the electric power converter. To be specific, according to the simulation results of FIGS. 9A to 9D, The diesel power generator 107 and the electric power converter 106a are operated in parallel. The electric power command of the electric power converter 106 is originally 0 kW and 0 kVar.

Regarding the droop setting of the frequency and the voltage, each of the three diesel power generators 107 and the two electric power converters 106 is set to 5%.

At the time of one second, the load increases from 40 kW, 30 kVar to 120 kW, 90 kVar.

At the time of two seconds, the active electric power command value of the electric power converter 106a is changed to 120 kW. Further, at the time of three seconds, the reactive electric power command value is changed to 90 kVar.

The initial electric power of the electric power converter 106a is substantially zero. However, at the time of the load change, the electric power converter 106a covers a certain percentage of the load. As with the actual power generator, the electric power converter 106a quickly performs the load sharing with respect to the load changes of the active electric power and the reactive electric power to reduce the changes in the system frequency and the system voltage. It is clear from this that the electric power converter 106 according to the present invention has an ability to stabilize the electric power system.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention can be preferably used as an electric power converter configured to maintain the quality of the power supply system in the stand-alone power supply system that is the combined power generation system including plural types of power supplies and may perform the interconnected operation. In addition, the present invention is also applicable to general power supply systems.

REFERENCE SIGNS LIST

1 AC power supply system
3 current detector
4 voltage detector
5 secondary battery
6 electric power conversion circuit 7 DC power line
8 filter reactor
11 system control device
13 current calculating portion
14 voltage/frequency/phase calculating portion
15 active/reactive electric power calculating portion
16 electric power converter control portion
17 battery state detector
18 secondary battery monitoring device
20 gate drive signal (PWM signal)
21 wire
22 wire
23 wire
30 αβ converter
31 PLL calculating circuit
32 phase comparator
34 loop filter
35 accumulator
40 frequency command value calculating portion
43 subtracter
44 proportional controller
45 first-order lag calculation unit
46 upper and lower limiter
47 adder
50 internal electromotive voltage command value calculating portion
53 subtracter
54 proportional controller
55 first-order lag calculation unit
56 upper and lower limiter
57 adder
58 function calculation unit
60 internal phase angle calculating portion
63 subtracter
64 accumulator
70 current command value calculating portion
72 function calculation unit
101 ship power supply system
102 ship electric power load
103 solar battery unit
104 electric power converting unit
105 secondary battery
106 electric power converter
107 diesel power generator
108 bow thruster
110 solar power generator
111 power storage facility
115 commercial electric power system
116 circuit breaker

The invention claimed is:

1. An electric power converter for a combined power generation system, the electric power converter being provided at a power supply system constituted by a plurality of electric power generation facilities each including a power storage facility including a power storage device and an electric power converting unit,
   the electric power converter comprising:
   a voltage measuring unit configured to measure a voltage of the power supply system;
   a frequency measuring unit configured to measure a frequency of the power supply system;
   an electric power measuring unit configured to measure active electric power and reactive electric power at an output terminal of the power storage facility; and
   a system control device, wherein:
   the system control device includes
      a frequency command value calculating portion including a first proportional calculation unit configured to perform a proportional calculation of a difference between an active electric power command value and the active electric power measured by the electric power measuring unit and a first adder configured to add a reference frequency to an output of the first proportional calculation unit to calculate a frequency command value,
      an internal phase angle calculating portion configured to accumulate a difference between the frequency command value calculated by the frequency command value calculating portion and the frequency measured by the frequency measuring unit, to calculate an internal phase angle,
      an internal electromotive voltage command value calculating portion including a second proportional calculation unit configured to perform a proportional calculation of a difference between a reactive electric power command value and the reactive electric power measured by the electric power measuring unit and a second adder configured to add a reference voltage to an output of the second proportional calculation unit to calculate an internal electromotive voltage command value, and
      a current command value calculating portion configured to calculate a command value of an output current of the electric power converting unit from the internal phase angle, the internal electromotive voltage command value, and the voltage measured by the voltage measuring unit; and
   the system control device outputs the command value of the output current to the electric power converting unit to control the electric power converting unit.

2. The electric power converter according to claim 1, wherein the internal electromotive voltage command value calculating portion subtracts a voltage drop from an output of the second adder to calculate the internal electromotive voltage command value, the voltage drop being caused by a total impedance that is a sum of an internal impedance of the power storage facility and an external impedance between the power storage facility and the power supply system.

3. The electric power converter according to claim 1, wherein in a case where the total impedance is connected between a power supply having the voltage measured by the voltage measuring unit and a power supply having a voltage shown by the internal electromotive voltage command value, a value of a current flowing through the total impedance is output as the command value of the output current.

4. The electric power converter according to claim 1, wherein a value of the internal impedance of the power storage facility is set to a value larger than an actual value, and the internal electromotive voltage and an output of the current command value calculating portion are calculated.

5. The electric power converter according to claim 1, wherein:
   the voltage measuring unit and the frequency measuring unit include a voltage detector configured to measure the voltage of the power supply system and a PLL calculating portion configured to perform a phase synchronous calculation of an output of the voltage detector;
   the voltage of the power supply system is detected from the output of the voltage detector; and
   the frequency and phase of the power supply system are detected from an output of the PLL calculating portion.

6. The electric power converter according to claim 1, wherein:
the electric power measuring unit includes a voltage detector configured to measure the voltage of the power supply system, a PLL calculating portion configured to perform a phase synchronous calculation of an output of the voltage detector, and a current detector configured to measure an output current of the power storage facility; and
the active electric power and the reactive electric power are calculated from an output of the current detector and a voltage calculated by the PLL calculating portion.

7. The electric power converter according to claim 1, wherein:
the frequency command value calculating portion is able to individually change a proportionality factor of the first proportional calculation unit and the active electric power command value; and
the internal electromotive voltage command value calculating portion is able to individually change a proportionality factor of the second proportional calculation unit and the reactive electric power command value.

8. The electric power converter according to claim 1, wherein:
a first time lag calculation unit is interposed between the first proportional calculation unit and the first adder; and
a second time lag calculation unit is interposed between the second proportional calculation unit and the second adder.

9. The electric power converter according to claim 1, wherein the power supply system is a stand-alone power supply system configured by connecting a prime mover power generator and a power generator utilizing natural energy.

10. The electric power converter according to claim 1, wherein the power supply system is a stand-alone power supply system configured by connecting a plurality of the power storage facilities.

11. The electric power converter according to claim 1, wherein a commercial electric power system is connectable to the power supply system through a circuit breaker.

* * * * *